United States Patent
Segal et al.

(10) Patent No.: US 10,469,521 B1
(45) Date of Patent: Nov. 5, 2019

(54) USING INFORMATION ABOUT EXPORTABLE DATA IN PENETRATION TESTING

(71) Applicant: XM Cyber Ltd., Hertzelia (IL)

(72) Inventors: Ronen Segal, Hertzelia (IL); Menahem Lasser, Kohav-Yair (IL)

(73) Assignee: XM Cyber Ltd., Hertsliya (IL)

( * ) Notice: Subject to any disclaimer, the term of this patent is extended or adjusted under 35 U.S.C. 154(b) by 0 days.

(21) Appl. No.: 16/379,820

(22) Filed: Apr. 10, 2019

Related U.S. Application Data

(60) Provisional application No. 62/755,480, filed on Nov. 4, 2018.

(51) Int. Cl.
*H04L 29/06* (2006.01)

(52) U.S. Cl.
CPC .......... *H04L 63/1433* (2013.01); *H04L 63/20* (2013.01)

(58) Field of Classification Search
CPC . H04L 63/1433; H04L 63/20; H04L 63/1416; H04L 63/145
See application file for complete search history.

(56) References Cited

U.S. PATENT DOCUMENTS

| | | |
|---|---|---|
| 6,918,038 B1 | 7/2005 | Smith et al. |
| 6,952,779 B1 | 10/2005 | Cohen et al. |
| 7,013,395 B1 | 3/2006 | Swiler et al. |
| 7,296,092 B2 | 11/2007 | Nguyen |
| 7,693,810 B2 * | 4/2010 | Donoho ................. G06Q 40/00 705/35 |
| 7,757,293 B2 | 7/2010 | Caceres et al. |
| 7,921,459 B2 * | 4/2011 | Houston ............. H04L 41/0604 709/223 |

(Continued)

FOREIGN PATENT DOCUMENTS

| | | |
|---|---|---|
| CN | 103200230 A | 7/2013 |
| CN | 103916384 A | 7/2014 |

(Continued)

OTHER PUBLICATIONS

CN103200230 Machine Translation (by EPO and Google)—published Jul. 10, 2013; Li Qianmu.

(Continued)

*Primary Examiner* — Hosuk Song
(74) *Attorney, Agent, or Firm* — Marc Van Dyke; Fourth Dimension IP

(57) ABSTRACT

Penetration testing campaigns are carried out using a lateral movement strategy based at least in part on information about files stored in network nodes of the networked system. Information is obtained about files stored in a plurality of network nodes of the networked system, and based on the obtained information, a corresponding data-value score for each network node of the plurality of network nodes is determined according to a common data-value metric. The penetration testing campaign is executed, during which a next network node targeted for determining its compromisability is selected based on the data-value scores corresponding to at least some of the plurality of network nodes. Based on results of the penetration testing campaign, a method by which an attacker could compromise the networked system is determined and reported.

21 Claims, 15 Drawing Sheets

RECONNAISSANCE AGENT PENETRATION TESTING

(56) References Cited

U.S. PATENT DOCUMENTS

| | | | |
|---|---|---|---|
| 7,934,254 B2* | 4/2011 | Graham | G06F 21/55 709/224 |
| 8,001,589 B2 | 8/2011 | Ormazabal et al. | |
| 8,112,016 B2 | 2/2012 | Matsumoto et al. | |
| 8,127,359 B2 | 2/2012 | Kelekar | |
| 8,356,353 B2 | 1/2013 | Futoransky et al. | |
| 8,365,289 B2 | 1/2013 | Russ et al. | |
| 8,392,997 B2* | 3/2013 | Chen | G06F 21/577 726/25 |
| 8,490,193 B2 | 7/2013 | Sarraute Yamada et al. | |
| 8,650,651 B2 | 2/2014 | Podjarny et al. | |
| 8,813,235 B2 | 8/2014 | Sidagni | |
| 9,015,847 B1 | 4/2015 | Kaplan et al. | |
| 9,076,013 B1 | 7/2015 | Bailey, Jr. et al. | |
| 9,183,397 B2 | 11/2015 | Futoransky et al. | |
| 9,224,117 B2 | 12/2015 | Chapman | |
| 9,270,696 B2 | 2/2016 | Fritzson et al. | |
| 9,276,952 B2 | 3/2016 | Simpson et al. | |
| 9,292,695 B1 | 3/2016 | Bassett | |
| 9,350,753 B2 | 5/2016 | Kaplan et al. | |
| 9,412,073 B2* | 8/2016 | Brandt | H04L 63/1408 |
| 9,467,467 B2 | 10/2016 | Alamuri | |
| 9,473,522 B1 | 10/2016 | Kotler et al. | |
| 9,558,355 B2 | 1/2017 | Madou et al. | |
| 9,760,716 B1 | 9/2017 | Mulchandani | |
| 9,800,603 B1 | 10/2017 | Sidagni | |
| 10,038,711 B1 | 7/2018 | Gorodissky et al. | |
| 10,068,095 B1 | 9/2018 | Segal et al. | |
| 10,122,750 B2 | 11/2018 | Gorodissky et al. | |
| 10,257,220 B2 | 4/2019 | Gorodissky | |
| 2005/0086502 A1 | 4/2005 | Rayes et al. | |
| 2005/0102534 A1 | 5/2005 | Wong | |
| 2007/0204347 A1 | 8/2007 | Caceres et al. | |
| 2008/0209567 A1 | 8/2008 | Lockhart et al. | |
| 2008/0256638 A1 | 10/2008 | Russ et al. | |
| 2008/0288822 A1 | 11/2008 | Wu et al. | |
| 2009/0044277 A1 | 2/2009 | Aaron | |
| 2009/0049553 A1 | 2/2009 | Vasudeva | |
| 2009/0172813 A1 | 7/2009 | Aaron | |
| 2010/0138925 A1 | 6/2010 | Barai et al. | |
| 2011/0035803 A1 | 2/2011 | Lucangeli Obes et al. | |
| 2012/0174228 A1 | 7/2012 | Giakouminakis et al. | |
| 2012/0255022 A1 | 10/2012 | Ocepek et al. | |
| 2013/0014263 A1 | 1/2013 | Porcello et al. | |
| 2013/0031635 A1 | 1/2013 | Lotem et al. | |
| 2014/0137257 A1 | 5/2014 | Martinez et al. | |
| 2014/0173739 A1 | 6/2014 | Ahuja et al. | |
| 2014/0237606 A1 | 8/2014 | Futoransky et al. | |
| 2016/0044057 A1 | 2/2016 | Chenette et al. | |
| 2016/0234251 A1 | 8/2016 | Boice et al. | |
| 2016/0234661 A1 | 8/2016 | Narasimhan et al. | |
| 2016/0248800 A1 | 8/2016 | Ng et al. | |
| 2016/0275289 A1 | 9/2016 | Sethumadhavan et al. | |
| 2016/0342796 A1 | 11/2016 | Kaplan et al. | |
| 2016/0352771 A1 | 12/2016 | Sivan et al. | |
| 2017/0006055 A1 | 1/2017 | Strom et al. | |
| 2017/0013008 A1 | 1/2017 | Carey et al. | |
| 2017/0046519 A1 | 2/2017 | Cam | |
| 2017/0063886 A1 | 3/2017 | Muddu et al. | |
| 2017/0098086 A1 | 4/2017 | Hoernecke et al. | |
| 2017/0104780 A1 | 4/2017 | Laffarano et al. | |
| 2017/0116421 A1 | 4/2017 | M C et al. | |
| 2017/0279843 A1 | 9/2017 | Schultz et al. | |
| 2017/0373923 A1 | 12/2017 | Kazachkov et al. | |
| 2018/0018465 A1 | 1/2018 | Carey et al. | |
| 2018/0219900 A1 | 8/2018 | Gorodissky et al. | |
| 2018/0219901 A1 | 8/2018 | Gorodissky et al. | |
| 2018/0219903 A1 | 8/2018 | Segal | |
| 2018/0219904 A1 | 8/2018 | Gorodissky et al. | |
| 2018/0219905 A1 | 8/2018 | Gorodissky et al. | |
| 2018/0219909 A1 | 8/2018 | Gorodissky et al. | |
| 2018/0270268 A1 | 9/2018 | Gorodissky et al. | |
| 2018/0365429 A1 | 12/2018 | Segal | |
| 2019/0014141 A1 | 1/2019 | Segal et al. | |
| 2019/0036961 A1 | 1/2019 | Gorodissky et al. | |

FOREIGN PATENT DOCUMENTS

| | | |
|---|---|---|
| CN | 104009881 A | 8/2014 |
| EP | 1559008 A1 | 8/2005 |
| WO | 0038036 A2 | 6/2000 |
| WO | 2008054982 A2 | 5/2008 |
| WO | 2010069587 A1 | 6/2010 |
| WO | 2013087982 A1 | 6/2013 |
| WO | 2015111039 A1 | 7/2015 |
| WO | 2016164844 A1 | 10/2016 |
| WO | 2018156394 A1 | 8/2018 |

OTHER PUBLICATIONS

Authors: Alhomidi and Reed Title: Attack Graph-Based Risk Assessment and Optimisation Approach International Journal of Network Security & Its Applications (IJNSA), vol. 6, No. 3, May 2014.

CN103916384 Machine Translation (by EPO and Google)—published Jul. 9, 2014 Zhong Li.

CN104009881 Machine Translation (by EPO and Google)—published Aug. 27, 2014 Wang Tian.

* cited by examiner for each network node in a group of multiple network nodes of the networked system, determining a corresponding data-value score according to a common data-value metric initiating execution of the penetration testing campaign during the execution of the penetration testing campaign:
    selecting a target network node of the networked system that will be the next network node that the penetration testing system will attempt to compromise or will attempt to determine to be compromisable, the selecting being based on the data-value scores corresponding to at least some of the multiple network nodes, and
    attempting to compromise the selected target network node or attempting to determine that the target network node is compromisable

A

FIG. 10A for each network node in a group of multiple network nodes of the networked system, determining a corresponding data-value score according to a common data-value metric executing a penetration testing campaign by the penetration testing system, the penetration testing campaign for testing the networked system based on results of the penetration testing campaign, determining the recommendation for improving the security of the networked system against attackers, the determining including selecting one or more network nodes of the networked system that should be protected against being compromised by the attackers, wherein the selecting of the one or more network nodes is based on the data-value scores corresponding to at least some of the multiple network nodes

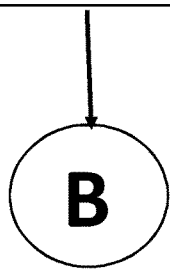

FIG. 11A

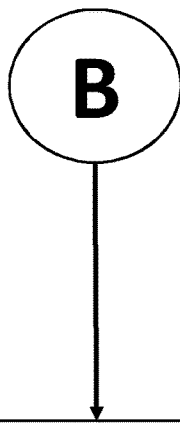

providing the recommendation for improving the security of the networked system, the providing of the recommendation for improving the security comprising at least one operation selected from the group consisting of: (i) causing a display device to display information about the recommendation for improving the security, (ii) recording the information about the recommendation for improving the security in a file, and (iii) electronically transmitting the information about the recommendation for improving the security

FIG. 11B

USING INFORMATION ABOUT EXPORTABLE DATA IN PENETRATION TESTING

CROSS-REFERENCE TO RELATED APPLICATIONS

This patent application claims the benefit of U.S. Provisional Patent Application No. 62/755,480 filed on Nov. 4, 2018 which is incorporated herein by reference in its entirety.

FIELD OF THE INVENTION

The present invention relates to systems and methods for penetration testing of networked systems, based on prioritizing the testing of those network nodes having exportable data with higher potential value to attackers. In particular, the present invention is suitable for penetration testing of networked systems using information about files stored in networked nodes in order to select nodes for testing and for recommending improvements to their security.

BACKGROUND

There is a growing proliferation of organizational networked computing systems. Every type of organization, be it a commercial company, a university, a bank, a government agency or a hospital, or any other kind of organization, heavily relies on one or more networks interconnecting multiple computing nodes. Failures of the networked computing system of an organization or even of only a portion of it might cause significant damage, up to and including completely shutting down all operations. Additionally, all data of the organization can exist somewhere on its networked computing system, including all confidential data comprising its "crown jewels" such as prices, details of customers, purchase orders, employees' salaries, technical formulas, etc. Loss of such data or leaks of such data to outside unauthorized entities might be disastrous for the organization.

As almost all organizational networks are connected to the Internet at least through one computing node, they are subject to attacks by computer hackers or by hostile adversaries. Quite often the newspapers report incidents in which websites have crashed, sensitive data has been stolen or service to customers has been denied, where the failures were the results of hostile penetration into an organization's networked computing system.

As a result, many organizations invest a lot of efforts and cost in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit that they don't really know how well they can withstand an attack from a given adversary. The only way to really know how strong and secure a system is, is by trying to attack it as a real adversary would. This is known as red-teaming or penetration testing (pen testing, in short), and is a very common approach that is even required by regulation in some developed countries.

Penetration testing requires highly talented people to man the red team. Those people should be familiar with each and every publicly known vulnerability and attacking method and should also have a very good familiarity with networking techniques and multiple operating systems implementations. Such people are hard to find and therefore many organizations give up establishing their own red teams and resort to hiring external expert consultants for carrying out that role (or completely give up penetration testing). But external consultants are expensive and therefore are typically called in only for brief periods separated by long intervals in which no such testing is done. This makes the penetration testing ineffective as vulnerabilities caused by new attacks that appear almost daily are discovered only months after becoming serious threats to the organization.

Additionally, even well-funded organizations that can afford to hire talented experts as in-house red teams do not achieve good protection. Testing for vulnerabilities of a large network containing many types of computers, operating systems, network routers and other devices is both a very complex and a very tedious process. The process is prone to human errors of missing testing for certain threats or misinterpreting the damages of certain attacks. Also, because a process of full testing against all threats is quite long, the organization might again end with a too long discovery period after a new threat appears.

Because of the above difficulties several vendors are proposing automated penetration testing systems. Such systems automatically discover and report vulnerabilities of a networked system, potential damages that might be caused to the networked system, and potential trajectories of attack that may be employed by an attacker.

A major goal of attackers of a networked system is to export important and confidential files out of the attacked networked system and into the attacker's hands. The exported data may be Excel files containing financial data, Word files containing business plans, password files containing passwords of multiple network nodes of the networked system, etc.

Not all network nodes of a networked system contain the same amount of important data and not all network nodes of a networked system contain data of the same importance or of the same confidentiality. For example, a finance manager's computer may contain dozens of Excel files containing confidential financial data, while an administration manager's computer in the same organization may contain only a couple of Word files containing unimportant administrative procedures.

Prior art penetration testing systems fail to take such facts into consideration, neither during the execution of penetration testing campaigns, nor when generating remediation recommendations after the completion of those campaigns.

When a user desires to operate a prior art penetration testing system for conducting a test on a specific networked system, the penetration testing system must know what test it should execute. For example, the penetration testing system must know what is the type of attacker against whom the test is making its assessment (a state-sponsored actor, a cyber-criminal etc.), and what are his capabilities. As another example, the penetration testing system must know what is the goal of the attacker according to which the attack will be judged as a success or a failure (copying a specific file and exporting it out of the tested networked system, encrypting a specific directory of a specific network node for demanding ransom, etc.).

A specific run of a specific test of a specific networked system by a penetration testing system is called a "campaign" of that penetration testing system. A collection of values for all information items a penetration testing system must know before executing a campaign is called "specifications of the campaign" or "scenario". For example, the type of the attacker and the goal of the attacker are specific information items of a campaign, and specific values for them are parts of the specifications of any campaign.

One special information item of a campaign is the lateral movement strategy of the attacker during the campaign.

The lateral movement strategy of an attacker is the decision logic applied by the attacker of a campaign for selecting the next network node to try to compromise.

During a penetration testing campaign, it is assumed that the attacker makes progress by an iterative process, wherein in each iteration the attacker selects the next node to attack, based on the group of network nodes that are already compromised and controlled by the attacker. If the attack on the selected node is successful, that node is added to the group of nodes that are already compromised, and another iteration begins. If the attempt to compromise the selected node fails, another node is selected, either according to the lateral movement strategy in use or randomly.

All types of penetration testing systems, whether using simulated penetration testing, actual attack penetration testing or some other form of penetration testing, must use a lateral movement strategy. In penetration testing systems that actually attack the tested networked system, the lateral movement strategy selects the path of attack actually taken through the networked system. In penetration testing systems that simulate or evaluate the results of attacking the tested networked system, the lateral movement strategy selects the path of attack taken in the simulation or the evaluation through the networked system. Therefore, in the present disclosure, the term "attack" should be understood to mean "actual attack or simulated/evaluated attack", the term "already controls" should be understood to mean "already controls or already determined to be able to control", the term "already compromised" should be understood to mean "already compromised or already determined to be compromisable", etc.

A simple example of a lateral movement strategy is a "depth first" strategy in which the next network node to attempt to compromise is a network node that is not yet compromised and is an immediate neighbor of the last network node that was compromised, provided such neighbor node exists. Two network nodes are "immediate neighbors" of each other if and only if they have a direct communication link between them that does not pass through any other network node.

Another simple example is a "breadth first" strategy, in which the next network node to attempt to compromise is a network node that is not yet compromised and whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one.

An example of a more advanced lateral movement strategy is a strategy that is applicable when a goal of the attacker is related to a resource of the networked system that resides in a specific network node. In such case, the next network node to try to compromise may be selected by determining the shortest path in the networked system leading from an already compromised node to the specific node containing the desired resource and selecting the first node on the determined path as the next node to attempt to compromise. If the shortest path has a length of one, which occurs when the specific node is an immediate neighbor of an already compromised node, then the next node to attempt to compromise is the specific node containing the desired resource.

Another example of a lateral movement strategy is a strategy that gives priority to network nodes satisfying a specific condition, for example nodes that are known to have a specific weakness, such as running the Windows XP operating system. In such case, the next node to attempt to compromise is a node that satisfies the condition and is also either an immediate neighbor of or reachable from an already compromised node, if such a node exists.

Lateral movement strategies used in prior art penetration testing systems pay no attention to the files stored in network nodes considered as candidates for the selection of the next network node to attempt to compromise. As an example, suppose the above-mentioned computers of the financial manager and the administration manager are the only two candidates for selection in a penetration testing system that uses the breadth-first lateral management strategy. If it so happens that the distance between the administration manager's computer and the first node compromised by the current campaign is smaller than the distance between the finance manager's computer and the first node compromised by the current campaign, then the breadth-first strategy will cause the selection of the administration manager's computer as the next node to attempt to compromise, even though the "spoil" (a.k.a. "yield") gained from compromising the finance manager's computer has much higher value.

The problem demonstrated by the above example is not only that the order of compromising network nodes is not reasonable—compromising less-valuable nodes before more-valuable nodes. Many penetration testing campaigns are carried out under a time limit, forcing them to terminate once the time limit is over. In such campaigns the unreasonable order of targeting nodes might result in terminating the campaign before a highly valuable node containing critical files is reached.

Thus, lateral movement strategies of prior art penetration testing systems might generate non-optimal movements during a campaign, causing a penetration campaign to miss opportunities available to attackers for capturing highly valuable file assets. In such case the result of a penetration test might give the user a false and unjustified sense of security.

Similarly, remediation recommendations generated by prior art penetration testing systems based on results of penetration testing campaigns pay no attention to the quantity and importance of data stored in files residing in network nodes of the tested networked system. As an example, suppose the above-mentioned computers of the financial manager and the administration manager are both identified by a campaign as points of vulnerability that might fail against a direct attack by an attacker. If it so happens that the cost of exploitation for an attacker to compromise the finance manager's computer is a bit higher than the cost of exploitation for an attacker to compromise the administration manager's computer, and the cost of remediation for the finance manager's computer to block its vulnerability is a bit higher than the cost of remediation for the administration manager's computer to block its vulnerability, then prior art penetration testing systems will typically recommend giving higher priority to fixing the vulnerability of the administration manager's computer, even though the real benefit from fixing the vulnerability of the finance manager's computer is much higher.

Thus, prior art penetration testing systems might generate non-optimal remediation recommendations following a campaign, causing a penetration test to result in investing resources in fixing a vulnerability that is not the most important to fix.

SUMMARY OF THE INVENTION

A method is disclosed, according to embodiments of the present invention, for carrying out a penetration testing campaign of a networked system by a penetration testing system, the method using a lateral movement strategy based at least in part on information about files stored in network nodes of the networked system. The method comprises: (a) obtaining information about files stored in a plurality of network nodes of the networked system; (b) based on the obtained information, determining, for each network node of the plurality of network nodes, a corresponding data-value score according to a common data-value metric; and (c) executing the penetration testing campaign, wherein the executing includes: (i) selecting a target network node of the networked system that will be the next network node that the penetration testing system will attempt to compromise or will attempt to determine to be compromisable, the selecting being based on the data-value scores corresponding to at least some of the plurality of network nodes, and (ii) attempting to compromise the selected target network node or attempting to determine that the selected target network node is compromisable. The method additionally comprises: (d) based on results of the penetration testing campaign, determining a method by which an attacker could compromise the networked system; and (e) reporting the method by which the attacker could compromise the networked system, wherein the reporting comprises at least one action selected from the group consisting of (i) causing a display device to display a report including information about the determined method by which the attacker could compromise the networked system, (ii) recording the report including the information about the determined method by which the attacker could compromise the networked system in a file, and (iii) electronically transmitting the report including the information about the determined method by which the attacker could compromise the networked system.

In some embodiments, the determining of the data-value scores corresponding to the plurality of network nodes can be done prior to initiating the executing of the penetration testing campaign. In some embodiments, the determining of the data-value scores corresponding to the plurality of network nodes can be done during the executing of the penetration testing campaign.

In some embodiments, it can be that the penetration testing system comprises: (i) a penetration testing software module installed on a remote computing device, and (ii) a reconnaissance agent software module installed on at least some of the plurality of network nodes of the networked system, and that for at least one network node of the plurality of network nodes, the determining of the data-value scores corresponding to the at least one network node can be at least partially done by the reconnaissance agent software module installed in the at least one network node.

In some embodiments, the executing of the penetration testing campaign can additionally include: prior to the selecting of the target network node, determining at least two network nodes to be candidates for being the target network node, and the target network node can be selected from the at least two network nodes.

In some embodiments, the data-value score corresponding to a given network node can be based on the total size of all files residing in the given network node. In some such embodiments, the data-value score corresponding to the given network node can be equal to the total size of all files residing in the given network node.

In some embodiments, the data-value score corresponding to a given network node can be based on the total size of all files residing in one or more given folders in the given network node. In some such embodiments, the data-value score corresponding to the given network node can be equal to the total size of all files residing in the one or more given folders in the given network node.

In some embodiments, the data-value score corresponding to a given network node can be based on the total size of all files of one or more given types residing in the given network node. In some such embodiments, the data-value score corresponding to the given network node can be equal to the total size of all files of the one or more given types residing in the given network node.

In some embodiments, the data-value score corresponding to a given network node can be based on the total size of all files of one or more given types residing in one or more given folders in the given network node. In some such embodiments, the data-value score corresponding to the given network node can be equal to the total size of all files of the one or more given types residing in the one or more given folders in the given network node.

In some embodiments, the data-value score corresponding to a given network node can be based on (i) multiple size numbers, each size number of the multiple size numbers being the total size of all files of one or more corresponding given types residing in the given network node or residing in one or more given folders in the given network node, and (ii) multiple weight factors, each weight factor of the multiple weight factors corresponding to a different size number of the multiple size numbers. In some such embodiments, the data-value score corresponding to the given network node can be calculated by (i) for each size number of the multiple size numbers, multiplying the size number by the corresponding weight factor to obtain a corresponding result, and (ii) calculating the data-value score of the given network node to be the sum of all the results corresponding to all of the multiple size numbers.

In some embodiments, the data-value score corresponding to a given network node can be based on (i) multiple size numbers, each size number of the multiple size numbers being the total size of all files residing in one or more corresponding given folders in the given network node or the total size of all files of one or more given types residing in the one or more corresponding given folders in the given network node, and (ii) multiple weight factors, each weight factor of the multiple weight factors corresponding to a different size number of the multiple size numbers. In some such embodiments, the data-value score corresponding to the given network node can be calculated by (i) for each size number of the multiple size numbers, multiplying the size number by the corresponding weight factor to obtain a corresponding result, and (ii) calculating the data-value score of the given network node to be the sum of all the results corresponding to all of the multiple size numbers.

In some embodiments, the data-value score corresponding to a given network node can be based on the number of all files residing in the given network node. In some such embodiments, the data-value score corresponding to the given network node can be equal to the number of all files residing in the given network node.

In some embodiments, the data-value score corresponding to a given network node can be based on the number of all files residing in one or more given folders in the given network node. In some such embodiments, the data-value score corresponding to the given network node can be equal to the number of all files residing in the one or more given folders in the given network node.

In some embodiments, the data-value score corresponding to a given network node can be based on the number of all files of one or more given types residing in the given network node. In some such embodiments, the data-value score corresponding to the given network node can be equal to the number of all files of the one or more given types residing in the given network node.

In some embodiments, the data-value score corresponding to a given network node can be based on the number of all files of one or more given types residing in one or more given folders in the given network node. In some such embodiments, the data-value score corresponding to the given network node can be equal to the number of all files of the one or more given types residing in the one or more given folders in the given network node.

In some embodiments, the data-value score corresponding to a given network node can be based on (i) multiple count numbers, each count number of the multiple count numbers being the number of all files of one or more corresponding given types residing in the given network node or residing in one or more given folders in the given network node, and (ii) multiple weight factors, each weight factor of the multiple weight factors corresponding to a different count number of the multiple count numbers. In some such embodiments, the data-value score corresponding to the given network node can be calculated by (i) for each count number of the multiple count numbers, multiplying the count number by the corresponding weight factor to obtain a corresponding result, and (ii) calculating the data-value score of the given network node to be the sum of all the results corresponding to all of the multiple count numbers.

In some embodiments, the data-value score corresponding to a given network node can be based on (i) multiple count numbers, each count number of the multiple count numbers being the number of all files residing in one or more corresponding given folders in the given network node or the number of all files of one or more given types residing in the one or more corresponding given folders in the given network node, and (ii) multiple weight factors, each weight factor of the multiple weight factors corresponding to a different count number of the multiple count numbers. In some such embodiments, the data-value score corresponding to the given network node can be calculated by (i) for each count number of the multiple count numbers, multiplying the count number by the corresponding weight factor to obtain a corresponding result, and (ii) calculating the data-value score of the given network node to be the sum of all the results corresponding to all of the multiple count numbers.

In some embodiments, the data-value score corresponding to a given network node can be based on one or more numbers selected from the group consisting of: (a) total size of all files residing in the given network node, (b) total size of all files residing in one or more given folders in the given network node, (c) total size of all files of one or more given types residing in the given network node, (d) total size of all files of one or more given types residing in one or more given folders in the given network node, (e) number of all files residing in the given network node, (f) number of all files residing in one or more given folders in the given network node, (g) number of all files of one or more given types residing in the given network node, and (h) number of all files of one or more given types residing in one or more given folders in the given network node. In some such embodiments, the calculation of the data-value score corresponding to the given network node can include multiplying each of the one or more numbers by a corresponding weight factor.

In some embodiments, the data-value score corresponding to a given network node can be based on a size of at least one file residing in a second network node that is reachable from the given network node.

In some embodiments, the data-value score corresponding to a given network node can be based on a size of at least one file residing in a portion of the networked system that is reachable from the given network node.

In some embodiments, the data-value score corresponding to a given network node can be based on a number selected from the group consisting of (i) number of files residing in a second network node, (ii) number of files residing in one or more given folders in the second network node, (iii) number of files residing in the second network node and are of one or more given types, and (iv) number of files residing in the one or more given folders in the second network node and are of the one or more given types, the second network node being reachable from the given network node.

In some embodiments, the data-value score corresponding to a given network node can be based on a number selected from the group consisting of (i) number of files residing in a portion of the networked system, (ii) number of files residing in one or more given folders in network nodes of the portion of the networked system, (iii) number of files residing in the portion of the networked system and are of one or more given types, and (iv) number of files residing in the one or more given folders in network nodes of the portion of the networked system and are of the one or more given types, the portion of the networked system being reachable from the given network node.

In some embodiments, the data-value score corresponding to a given network node can depend on whether at least one file is read-only or not.

In some embodiments, the data-value score corresponding to a given network node can depend on whether at least one file is a binary file or not.

A penetration testing system is disclosed, according to embodiments of the present invention, for carrying out a penetration testing campaign of a networked system by using a lateral movement strategy based at least in part on information about files stored in network nodes of the networked system, the networked system comprising a plurality of network nodes interconnected by one or more networks, each network node of the plurality of network nodes including one or more processors. The penetration testing system comprises: (a) a first non-transitory computer-readable storage medium having stored therein first program instructions, wherein execution of the first program instructions by the one or more processors of a given network node of the plurality of network nodes causes the one or more processors of the given network node to collect information about files stored in the given network node: (b) a computing device comprising one or more processors, the computing device in networked communication with multiple network nodes of the networked system; and (c) a second non-transitory computer-readable storage medium having stored therein second program instructions, wherein execution of the second program instructions by the one or more processors of the computing device causes the one or more processors of the computing device to carry out the following steps: (i) for each given network node of the plurality of network nodes, performing one operation selected from the group consisting of (A) determining a corresponding data-value score according to a common data-value metric and (B) obtaining the corresponding data-value score according to the common data-value metric, the corresponding data-value score being based on collected information about files stored in the networked system; (ii) executing the penetration testing campaign, wherein the executing includes: (A) selecting a target network node of the networked system that will be the next network node that the penetration testing system will attempt to compromise or will attempt to determine to be compromisable, the selecting being based on the data-value scores corresponding to at least some of the plurality of network nodes, and (B) attempting to compromise the selected target network node or attempting to determine that the selected target network node is compromisable; (iii) based on results of the penetration testing campaign, determining a method by which an attacker could compromise the networked system; and (iv) reporting the method by which the attacker could compromise the networked system, wherein the reporting comprises at least one action selected from the group consisting of (A) causing a display device to display a report including information about the determined method by which the attacker could compromise the networked system, (B) recording the report including the information about the determined method by which the attacker could compromise the networked system in a file, and (C) electronically transmitting the report including the information about the determined method by which the attacker could compromise the networked system.

In some embodiments, the one operation includes calculating the corresponding data-value score based on the collected information about files stored in the networked system.

In some embodiments, the one operation includes obtaining the corresponding data-value score from the given network node.

A method is disclosed, according to embodiments of the present invention, for delivering, by a penetration testing system, a recommendation for improving the security of a networked system against attackers. The method comprises: (a) obtaining information about files stored in a plurality of network nodes of the networked system; (b) based on the obtained information, determining, for each network node of the plurality of network nodes, a corresponding data-value score according to a common data-value metric; (c) executing a penetration testing campaign for testing the networked system; (d) determining the recommendation for improving the security of the networked system against attackers, wherein the determining of the recommendation includes selecting one or more network nodes of the networked system that should be protected against being compromised by the attackers, wherein the selecting of the one or more network nodes is based on (i) results of the penetration testing campaign and (ii) the data-value scores corresponding to at least some of the plurality of network nodes; and (e) performing at least one operation selected from the group consisting of: (i) causing a display device to display information about the recommendation for improving the security of the networked system against attackers, (ii) recording the information about the recommendation for improving the security of the networked system against attackers in a file, and (iii) electronically transmitting the information about the recommendation for improving the security of the networked system against attackers.

In some embodiments, the determining of the data-value scores corresponding to the plurality of network nodes can be done prior to the executing of the penetration testing campaign.

In some embodiments, the determining of the data-value scores corresponding to the plurality of network nodes can be done during the executing of the penetration testing campaign or subsequent to the executing of the penetration testing campaign.

In some embodiments of the method, it can be that the penetration testing system comprises (i) a penetration testing software module installed on a remote computing device, and (ii) a reconnaissance agent software module installed on at least some of the plurality of network nodes of the networked system, and for at least one network node of the plurality of network nodes, the determining of the data-value scores corresponding to the at least one network node can be at least partially done by the reconnaissance agent software module installed in the at least one network node.

In some embodiments, the selected one or more network nodes can be included in the plurality of network nodes.

In some embodiments, the data-value score corresponding to a given network node can be based on the total size of all files residing in the given network node. In some such embodiments, the data-value score corresponding to the given network node can be equal to the total size of all files residing in the given network node.

In some embodiments, the data-value score corresponding to a given network node can be based on the total size of all files residing in one or more given folders in the given network node. In some such embodiments, the data-value score corresponding to the given network node can be equal to the total size of all files residing in the one or more given folders in the given network node.

In some embodiments, the data-value score corresponding to a given network node can be based on the total size of all files of one or more given types residing in the given network node. In some such embodiments, the data-value score corresponding to the given network node can be equal to the total size of all files of the one or more given types residing in the given network node.

In some embodiments, the data-value score corresponding to a given network node can be based on the total size of all files of one or more given types residing in one or more given folders in the given network node. In some such embodiments, the data-value score corresponding to the given network node can be equal to the total size of all files of the one or more given types residing in the one or more given folders in the given network node.

In some embodiments, the data-value score corresponding to a given network node can be based on (i) multiple size numbers, each size number of the multiple size numbers being the total size of all files of one or more corresponding given types residing in the given network node or residing in one or more given folders in the given network node, and (ii) multiple weight factors, each weight factor of the multiple weight factors corresponding to a different size number of the multiple size numbers.

In some embodiments, the data-value score corresponding to the given network node can be calculated by (i) for each size number of the multiple size numbers, multiplying the size number by the corresponding weight factor to obtain a corresponding result, and (ii) calculating the data-value score of the given network node to be the sum of all the results corresponding to all of the multiple size numbers.

In some embodiments, the data-value score corresponding to a given network node can be based on (i) multiple size numbers, each size number of the multiple size numbers being the total size of all files residing in one or more corresponding given folders in the given network node or the total size of all files of one or more given types residing in the one or more corresponding given folders in the given network node, and (ii) multiple weight factors, each weight factor of the multiple weight factors corresponding to a different size number of the multiple size numbers. In some such embodiments, the data-value score corresponding to the given network node can be calculated by (i) for each size number of the multiple size numbers, multiplying the size number by the corresponding weight factor to obtain a corresponding result, and (ii) calculating the data-value score of the given network node to be the sum of all the results corresponding to all of the multiple size numbers.

In some embodiments, the data-value score corresponding to a given network node can be based on the number of all files residing in the given network node. In some such embodiments, the data-value score corresponding to the given network node can be equal to the number of all files residing in the given network node.

In some embodiments, the data-value score corresponding to a given network node can be based on the number of all files residing in one or more given folders in the given network node. In some such embodiments, the data-value score corresponding to the given network node can be equal to the number of all files residing in the one or more given folders in the given network node.

In some embodiments, the data-value score corresponding to a given network node can be based on the number of all files of one or more given types residing in the given network node. In some such embodiments, the data-value score corresponding to the given network node can be equal to the number of all files of the one or more given types residing in the given network node.

In some embodiments, the data-value score corresponding to a given network node can be based on the number of all files of one or more given types residing in one or more given folders in the given network node. In some such embodiments, the data-value score corresponding to the given network node can be equal to the number of all files of the one or more given types residing in the one or more given folders in the given network node.

In some embodiments, the data-value score corresponding to a given network node can be based on (i) multiple count numbers, each count number of the multiple count numbers being the number of all files of one or more corresponding given types residing in the given network node or residing in one or more given folders in the given network node, and (ii) multiple weight factors, each weight factor of the multiple weight factors corresponding to a different count number of the multiple count numbers. In some such embodiments, the data-value score corresponding to the given network node can be calculated by (i) for each count number of the multiple count numbers, multiplying the count number by the corresponding weight factor to obtain a corresponding result, and (ii) calculating the data-value score of the given network node to be the sum of all the results corresponding to all of the multiple count numbers.

In some embodiments, the data-value score corresponding to a given network node can be based on (i) multiple count numbers, each count number of the multiple count numbers being the number of all files residing in one or more corresponding given folders in the given network node or the number of all files of one or more given types residing in the one or more corresponding given folders in the given network node, and (ii) multiple weight factors, each weight factor of the multiple weight factors corresponding to a different count number of the multiple count numbers. In some such embodiments, the data-value score corresponding to the given network node can be calculated by (i) for each count number of the multiple count numbers, multiplying the count number by the corresponding weight factor to obtain a corresponding result, and (ii) calculating the data-value score of the given network node to be the sum of all the results corresponding to all of the multiple count numbers.

In some embodiments, the data-value score corresponding to a given network node can be based on one or more numbers selected from the group consisting of: (a) total size of all files residing in the given network node, (b) total size of all files residing in one or more given folders in the given network node, (c) total size of all files of one or more given types residing in the given network node, (d) total size of all files of one or more given types residing in one or more given folders in the given network node, (e) number of all files residing in the given network node, (f) number of all files residing in one or more given folders in the given network node, (g) number of all files of one or more given types residing in the given network node, and (h) number of all files of one or more given types residing in one or more given folders in the given network node. In some such embodiments, the calculation of the data-value score corresponding to the given network node can include multiplying each of the one or more numbers by a corresponding weight factor.

In some embodiments, the data-value score corresponding to a given network node can be based on a size of at least one file residing in a second network node that is reachable from the given network node.

In some embodiments, the data-value score corresponding to a given network node can be based on a size of at least one file residing in a portion of the networked system that is reachable from the given network node.

In some embodiments, the data-value score corresponding to a given network node can be based on a number selected from the group consisting of (i) number of files residing in a second network node, (ii) number of files residing in one or more given folders in the second network node, (iii) number of files residing in the second network node and are of one or more given types, and (iv) number of files residing in the one or more given folders in the second network node and are of the one or more given types, the second network node being reachable from the given network node.

In some embodiments, the data-value score corresponding to a given network node can be based on a number selected from the group consisting of (i) number of files residing in a portion of the networked system, (ii) number of files residing in one or more given folders in network nodes of the portion of the networked system, (iii) number of files residing in the portion of the networked system and are of one or more given types, and (iv) number of files residing in the one or more given folders in network nodes of the portion of the networked system and are of the one or more given types, the portion of the networked system being reachable from the given network node.

In some embodiments, the data-value score corresponding to a given network node can depend on whether at least one file is read-only or not.

In some embodiments, the data-value score corresponding to a given network node can depend on whether at least one file is a binary file or not.

A penetration testing system is disclosed in accordance with embodiments of the present invention. The system is configured to carry out a penetration testing campaign for testing a networked system and to deliver a recommendation for improving the security of the networked system against attackers based at least in part on information about files stored in network nodes of the networked system, the networked system comprising a plurality of network nodes interconnected by one or more networks, each network node of the plurality of network nodes including one or more processors. The penetration testing system comprises: (a) a first non-transitory computer-readable storage medium having stored therein first program instructions, wherein execution of the first program instructions by the one or more processors of a given network node of the plurality of network nodes causes the one or more processors of the given network node to collect information about files stored in the given network node; (b) a computing device comprising one or more processors, the computing device in networked communication with multiple network nodes of the networked system; and (c) a second non-transitory computer-readable storage medium having stored therein second program instructions, wherein execution of the second program instructions by the one or more processors of the computing device causes the one or more processors of the computing device to carry out the following steps: (i) for each given network node of the plurality of network nodes, performing one operation selected from the group consisting of (A) determining a corresponding data-value score according to a common data-value metric and (B) obtaining the corresponding data-value score according to the common data-value metric, the corresponding data-value score being based on collected information about files stored in the networked system; (ii) executing the penetration testing campaign; (iii) determining the recommendation for improving the security of the networked system against attackers, wherein the determining of the recommendation includes selecting one or more network nodes of the networked system that should be protected against being compromised by the attackers, wherein the selecting of the one or more network nodes is based on (A) results of the penetration testing campaign and (B) the data-value scores corresponding to at least some of the plurality of network nodes; and (iv) performing at least one action selected from the group consisting of: (A) causing a display device to display information about the recommendation for improving the security of the networked system against attackers, (B) recording the information about the recommendation for improving the security of the networked system against attackers in a file, and (C) electronically transmitting the information about the recommendation for improving the security of the networked system against attackers.

In some embodiments, the one operation includes calculating the corresponding data-value score based on the collected information about files stored in the networked system.

In some embodiments, the one operation includes obtaining the corresponding data-value score from the given network node.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIGS. 10A, 10B, 11A and 11B show flow charts of methods of penetration testing of a networked system according to different embodiments of the present invention.

DETAILED DESCRIPTION OF THE EMBODIMENTS

Figure 1:
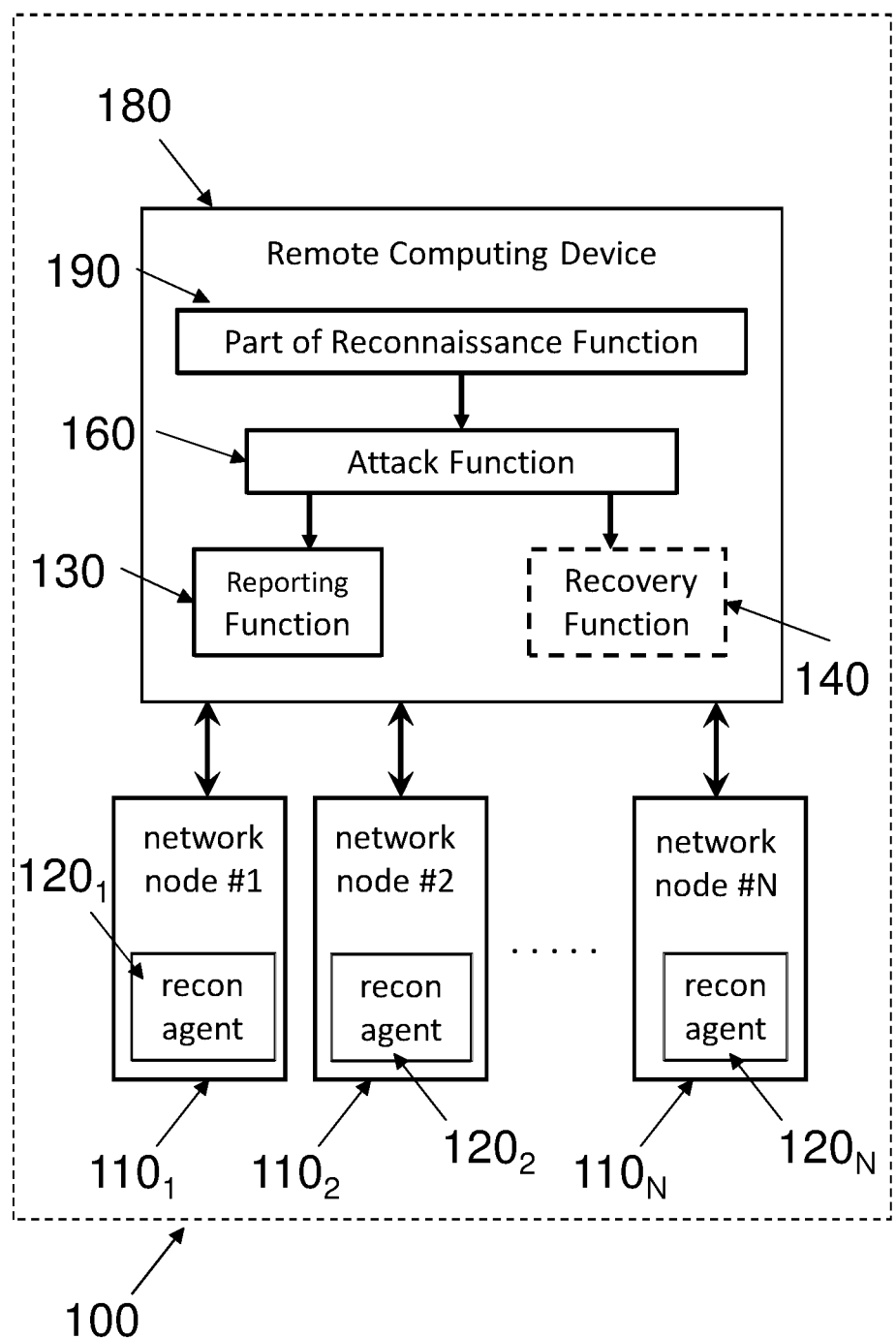
FIG. 1 is a functional block diagram of a reconnaissance agent penetration testing system which may employ embodiments of the present invention.

According to embodiments, a penetration testing system determines the amount and/or importance of data residing in files in various network nodes of the tested networked system and relies on these determinations for generating an improved lateral movement strategy in the campaigns it carries out. Additionally or alternatively, these determinations are also used for generating improved remediation recommendations following the campaigns.

In order to achieve the above goals, the proposed penetration testing system uses a data-value metric that grades the value of the file content of a network node (i.e. the amount and/or the importance of the file content of a network node) and provides a score representing that value. In preferred embodiments, the score is a numeric score. In other embodiments, the score can be non-numeric; for example, the highest range of values can be given a score of 'A', the second highest range of values a score of 'B', and so on. The scores calculated by the data-value metric enable a comparison between different nodes using a meaningful scale that reflects the "value" of the file content of the different nodes for the attacker and/or for the owner of the tested networked system. The score produced by a data-value metric may be measured in megabytes or gigabytes and may correspond to real amounts of data stored in files, but this is not necessarily so. For example, when calculating scores by a data-value metric for a node, the importance or confidentiality of various files may be taken into account by employing weight factors that increase or decrease the score determined according to the real amounts of data. However, a data-value metric need not be limited to using scores naturally associated with file sizes (e.g. megabytes or gigabytes)—any numeric scale may be used, as long as it is monotonically increasing or monotonically decreasing with the "value" of the files residing in an evaluated network node.

The following is a list of examples of how scores for data-value metrics can be calculated, according to embodiments. Throughout this disclosure, all examples are illustrative and non-limiting, and all lists or sets of examples are non-exhaustive.

In a first example, the score generated by a data-value metric for a network node is the amount of data, for example measured in megabytes or gigabytes, included in all the files residing in the network node.

In a second example, the score generated by a data-value metric for a network node is the amount of data included in all the files residing in a given location in the network node. For example, the amount of data included in all the files residing in the "My Documents" folder of the administrator user of the network node.

In a third example, the score generated by a data-value metric for a network node is the amount of data included in all files of a certain file type residing in the network node. For example, the amount of data included in all Excel files residing in the network node. Typically, the type of a file is indicated by the extension part of its file name (e.g. "xls" and "xlsx" extensions for Excel files).

In a fourth example, the score generated by a data-value metric for a network node is the amount of data included in all files of multiple certain file types. For example, the amount of data included in all Excel files residing in the network node plus the amount of data included in all Word files residing in the network node.

In a fifth example, the score generated by a data-value metric for a network node is again the amount of data included in all files of multiple certain file types, but this time the summation is done using different weights for different types of files. For example, the score generated by the data-value metric may be equal to twice the amount of data included in Excel files plus the amount of data included in Word files, reflecting the idea that Excel files are twice as important as Word files. (Note that for this data-value metric the score does not represent real megabytes or gigabytes, but somewhat arbitrary numbers).

In a sixth example, the score generated by a data-value metric for a network node is the number of files (regardless of their size) residing in the network node. Alternatively, the counting of files residing in the network node may be limited to certain folders, to certain file types, or to both certain folders and certain file types.

In other examples, the calculation of a data-value metric may employ a combination of two or more of the above factors. For example, the score generated by a data-value metric for a network node may be the amount of data included in all Excel files residing in the "My documents" folder of the administrator user of the network node. Or the score generated by a data-value metric for a network node may be three times the amount of data included in Excel files residing in the "My Documents" folder of the administrator user plus the amount of data included in Word files residing anywhere in the network node.

Whatever the data-value metric is, it is used in a similar way, with the logic of the lateral movement strategy depending in some way on the scores generated by the data-value metric for the candidate nodes. If the numerical score generated by a data-value metric increases as the value of the data increases, then the logic may be that in each selection of a next node to attempt to compromise, the node to select from the group of candidates will be the node having the numerically highest data-value score. If the numerical score generated by a data-value metric decreases as the value of the data increases, then the logic may be that in each selection of a next node to attempt to compromise, the node to select from the group of candidates will be the node having the numerically lowest data-value score.

Thus far in this disclosure, the data-value metric of a given network node has been described as depending only on the files residing within the given node. A possible issue with the above logic is that the given node by itself might have a very low data-value score, but that node may serve as a gateway only through which one or more other network nodes having high data-value scores are accessible. If a data-value metric score of the given network node is calculated based only on information regarding the files on the given network node itself, the given network node may not be selected as a target for compromising because of its low data-value score, thus causing the highly-valuable other nodes hiding behind it to be unreachable during a penetration testing campaign that is time-limited.

This issue can be resolved by employing data value metrics that take into account not only the value of the files residing in the given network node, but also the value of the files residing in network nodes that are immediate neighbors of the given network node or otherwise reachable from the given network node and are not yet compromised. As a non-limiting example, the logic may be that in each selection of a next node to attempt to compromise, the node to select from the group of candidates will be the node having the highest data-value score, where the data-value score of a given node is the sum of the data-value score of the given node when having no neighbors plus half of the data-value scores of all its immediate neighboring nodes that are not yet compromised or of all network nodes that are reachable only through the given node and are not yet compromised. Those immediate neighboring nodes or reachable network nodes become accessible to the attacker after compromising the given node, while not being accessible to the attacker before compromising the given node. Therefore, they are relevant to the calculation of the data-value that might fall into the attacker's hands and/or lost by the networked system owner when the given network node is compromised.

The lateral movement strategy may depend on other factors in addition to its dependency on the data-value metric of the nodes. For example, the lateral movement strategy may be "breadth-first plus data-value metric", in which case the candidate nodes are first sorted according to distance from the first node compromised by the current campaign, and in case of a tie the data-value metric decides. Or the lateral movement strategy may be "data-value metric plus breadth-first", in which case the candidate nodes are first sorted according to their data-value scores, and in case of a tie the distance from the first node compromised by the current campaign decides.

The solutions disclosed herein are applicable to all types of penetration testing systems, whether using simulated penetration testing, actual attack penetration testing or some other form of penetration testing. However, the solutions are especially beneficial when using reconnaissance agent penetration testing systems. In such systems, in many (possibly all) of the network nodes taking part in the test there is installed a reconnaissance agent software module whose task is to collect information about its hosting node and to report it to a central computing device of the penetration testing system. In such reconnaissance agent penetration testing systems, the ability to find out the data-value score of a node and to bring it to the attention of the software module implementing the lateral movement strategy is already built-in into the system's architecture and requires almost no extra infrastructure effort. The agent installed in a node searches the files structure of its hosting node for files of the required type (e.g. Excel files) and/or the required location (e.g. My Documents), determines relevant file sizes, computes the resulting data-value score and reports the resulting score to the central penetration testing computing device.

An example of a reconnaissance agent penetration testing system that may easily benefit from the embodiments of the present invention can be seen in U.S. Pat. No. 10,038,711, which is fully incorporated by reference herein.

As stated above, the agent may locally implement the calculation of the data-value score and report out only the final value of the data-value score of the node. Alternatively, the agent may report raw data or partial results (e.g. the amount of data included in Excel files and the amount of data included in Word files) and let the central computing device combine the raw data and/or partial results into the final value of the data-value score of the node (e.g. twice the amount of Excel data plus half the amount of Word data).

In both cases, the central computing device of the penetration testing system uses the obtained data-value scores for lateral movement decisions and (as explained below) for remediation recommendations decisions.

Referring now to the figures, and in particular to FIG. 1, a functional block diagram of a penetration testing system 100 is shown according to some embodiments, comprising a reconnaissance function as defined as definition "14" in the Definitions Section later in this specification. The reconnaissance function includes functionality in reconnaissance agents 120 ($120_1$, $120_2$, . . . $120_N$) installed in respective network nodes 110 ($110_1$, $110_2$, . . . $110_N$) and, in some embodiments, also includes functionality in a remote computing device 180 in which is installed "part of reconnaissance function" 190. In some embodiments, an attack function 160, as defined as definition "15" in the Definitions Section, a reporting function 130 as defined as definition "16" in the Definitions Section, and optionally a recovery function 140 (also known in the industry as a 'clean-up' function and synonymous therewith), as defined as definition "17" in the Definitions Section, are all installed in the remote computing device 180. As explained in definition "15", an 'attack function' forms part of the architecture of every penetration testing system and performs the function of determining whether one or more security vulnerabilities exist in the tested networked system. In an alternative embodiment (NOT SHOWN), one or more network nodes of the tested networked system act as the remote computing device, so that any or all of the above-listed functions are installed in network nodes 110 instead of in a physically-remote remote computing device 180, or, alternatively, the functionality of the remote computing device 180 of FIG. 1 is split between the physically-remote remote computing device 180 and the network nodes 110.

A reconnaissance agent, or a reconnaissance client agent, which is synonymous therewith, is a software module designed to be installed in nodes of the tested networked system. A reconnaissance client agent is able to communicate with a remote computing device hosting a penetration testing software module responsible, among other things, for managing and conducting the penetration testing process. A reconnaissance client agent can report, to the penetration testing software module when installed on the remote computing device, data extracted by the agent from its hosting node.

Figure 2:
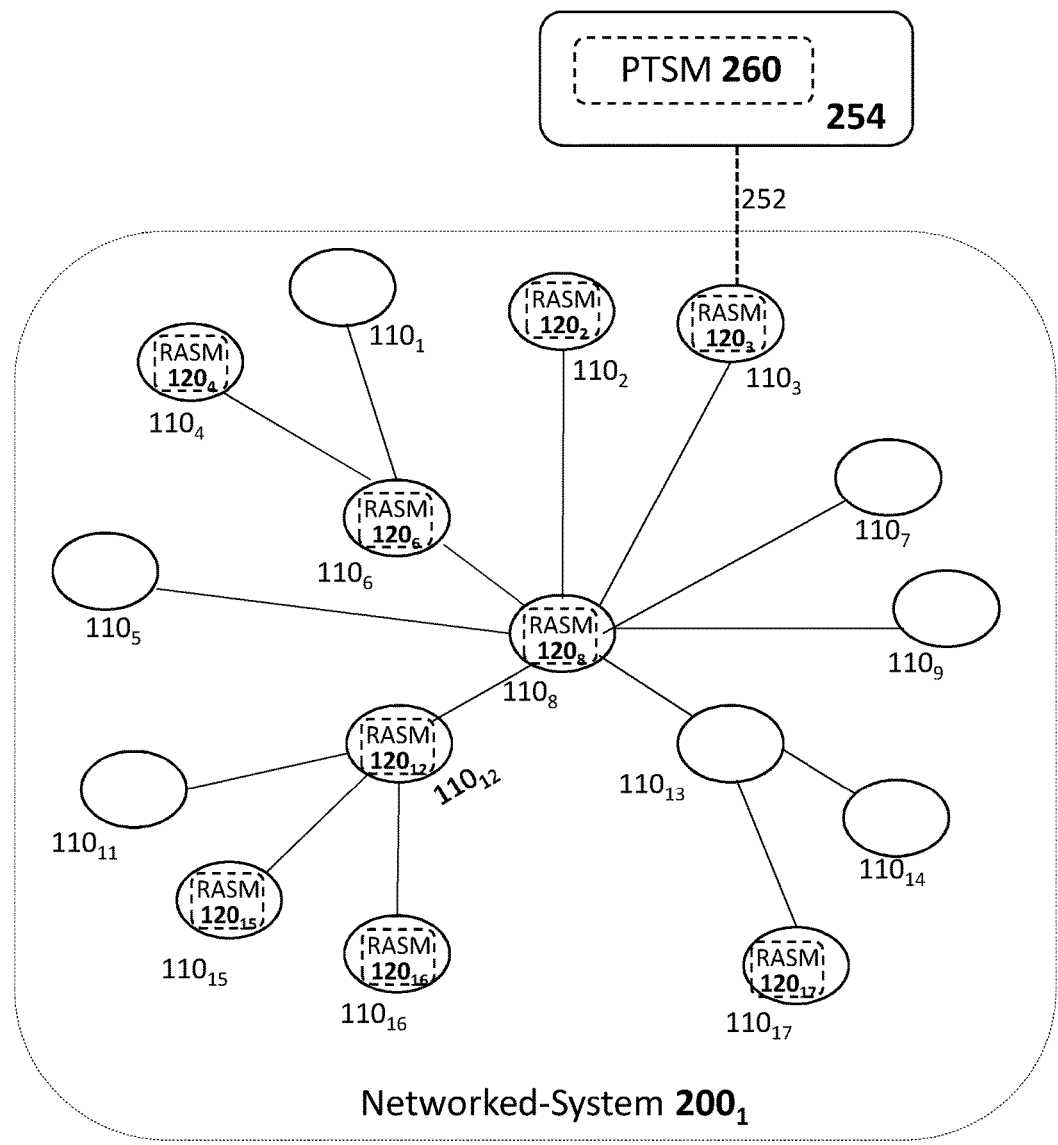
FIG. 2 shows a schematic illustration of a networked system that may be tested according to embodiments of the present invention, the networked system comprising multiple network nodes, some of which have a reconnaissance agent software module installed therein, and a remote computing device having a penetration testing software module installed therein and in connection with the networked system.

Referring now to FIG. 2, an example of a penetration testing system is illustrated schematically in accordance with embodiments of the invention. The penetration testing system comprises a penetration testing software module (PTSM) 260 installed on a computing device 254—in this example remote from the networked system—and a reconnaissance agent software module (RASM) 120 installed on at least some of a plurality of network nodes 110 of a networked system $200_1$.

The number of network nodes 110 can be as few as two and as many as several hundred or several thousand. They can be connected hierarchically, peer-to-peer, hub-and-spoke, or in any combination of connections as long as each networked node 110 is connected to at least one other node 110.

In the example of FIG. 2, the remote computing device 254 on which the PTSM 260 is installed is external to the networked system $200_1$ and is in communication with the networked system $200_1$ by an Internet connection 252. In this case, the physical location of remote computing device 254 is unimportant. It can be, by way of non-limiting examples, at a physical location belonging to a supplier or operator of a penetration testing system, in a 'cloud' server farm of an Internet services or cloud services provider, or it can be physically co-located with some or all of the network nodes 110.

Ways in which an attacker can compromise a networked system such as networked system $200_1$ are disclosed in U.S. Pat. No. 10,038,711 and in co-pending and commonly assigned US Patent Publication No. 2018/0270268 filed on May 18, 2018, both of which are incorporated herein by reference in their entirety.

Once a networked node 110 is compromised, the attacker can copy and export data files from the node, out of the network and to the attacker's computer outside the networked system $200_1$.

In the embodiments disclosed herein, the determination that a network node can be compromised may be achieved either with or without risking compromising the networked system during the penetration testing.

In embodiments of the present invention, reconnaissance agents of the penetration testing system may report to the remote computing device of data collected in the network nodes hosting the agents, including information about files stored at the respective network node.

Figure 3:
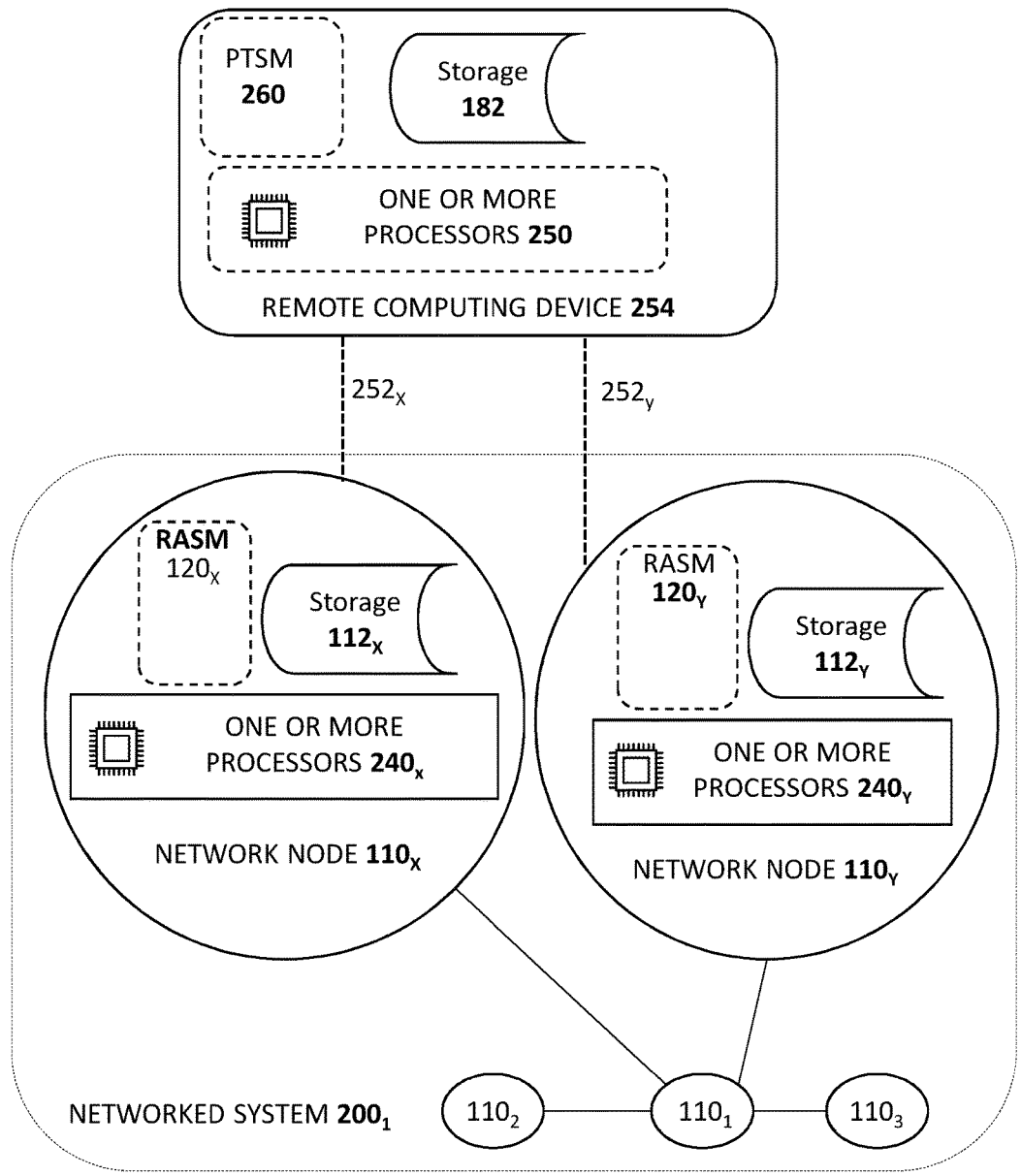
FIG. 3 shows a block diagram of a networked system having first and second network nodes each of which has a reconnaissance agent software module installed therein, and a remote computing device having a penetration testing software module installed therein and in connection with the networked system, according to embodiments of the present invention.

Networked system $200_1$ of FIG. 3 includes a plurality of network nodes 110. Five nodes 110 ($110_1$, $110_2$, $110_3$, $110_X$ and $110_Y$) are shown, but the networked system $200_1$ can include any number of nodes. The nodes 110 may be connected by a single network, but in some embodiments at least some of the nodes and respective connections can form sub-networks, so that the networked system $200_1$ is composed of multiple sub-networks that are in communication with each other. For example, nodes $110_2$ and $110_1$ may be a separate sub-network, with $110_1$ being a gateway or a router. Reconnaissance agent software modules $120_X$, $120_Y$ are installed in first and second network nodes $110_X$, $110_Y$. As disclosed earlier, the RASM 120 can be installed in any or all of the network nodes 110. The RASMs 120, or at least some program instructions thereof, can be stored in respective storage media 112 of corresponding network nodes 110.

Figure 4A:
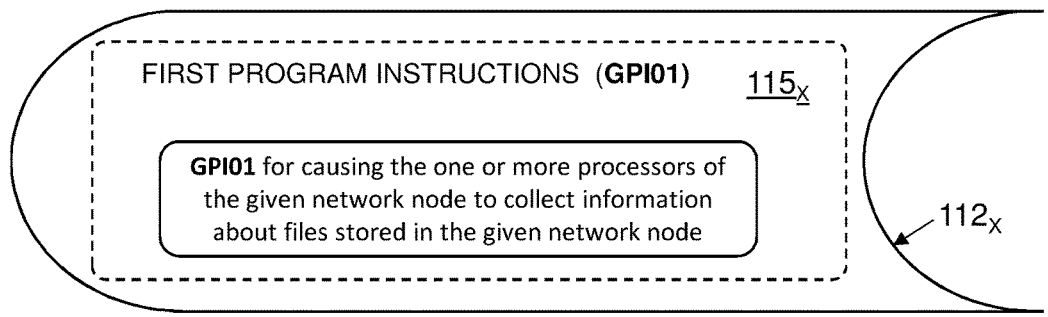
FIGS. 4A and 4B are, respectively, block diagrams of first and second non-transitory computer-readable storage media installed at the first and second network nodes of FIG. 3, comprising respective program instructions, according to embodiments of the present invention.

Components of a penetration testing system, along with other hardware and software components related to the execution of a penetration testing campaign by a penetration testing system, are illustrated in FIG. 3. The penetration testing system itself comprises:

1. A first reconnaissance-agent non-transitory computer-readable storage medium $112_X$ which is associated with a first node $110_X$. This first storage medium $112_X$ is provided for storage of first instructions $115_X$ of the reconnaissance agent software module for execution by one or more processors $240_X$ of the first network node $110_X$, which is in electronic communication with a remote computing device 254 (by communications arrangement $252_X$ which can be an Internet connection or a LAN connection or any other suitable connection, including an indirect connection). A reconnaissance agent software module $120_X$ is installed in the network node $110_X$. The first storage medium $112_X$ is shown for convenience as being part of the network node $110_X$ but it can be anywhere as long as the one or more processors $240_X$ can access and execute the instructions $115_X$ stored therein. As shown in the block diagram of FIG. 4A, the first instructions $115_X$ stored in first reconnaissance-agent non-transitory computer-readable storage medium $112_X$, comprise a first group of program instructions GPI01 for causing the one or more processors $240_X$ of the network node $110_X$ to collect information about files stored in the network node $110_X$.

Figure 4B:
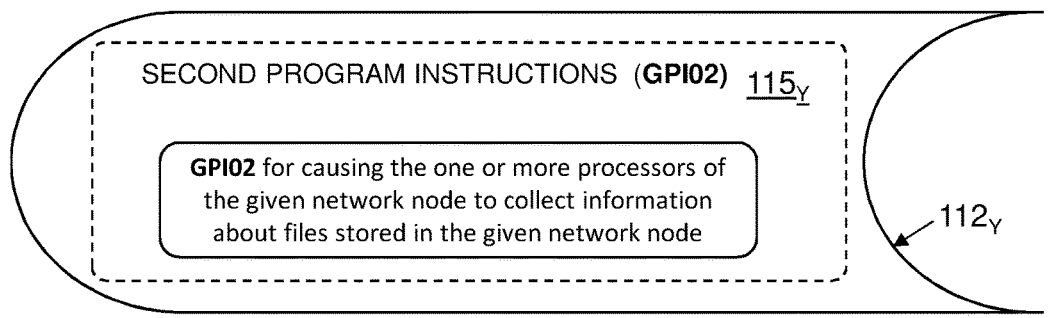

2. A second reconnaissance-agent non-transitory computer-readable storage medium $112_Y$ which is associated with the second node $110_Y$. This second storage medium $112_Y$ is provided for storage of instructions $115_Y$ of the reconnaissance agent software module for execution by one or more processors $240_Y$ of the second network node $110_Y$, which is also in electronic communication with a remote computing device 254 (by communications arrangement $252_Y$ which can be the same as communications arrangement $252_X$ or separate and/or different). A reconnaissance agent software module $120_Y$ is installed in the network node $110_Y$. The second storage medium $112_Y$ is also shown for convenience as being part of the network node $110_Y$ but it can be anywhere as long as the one or more processors $240_Y$ can access and execute the instructions $115_Y$ stored therein. As shown in the block diagram of FIG. 4B, the second instructions $115_Y$ stored in second reconnaissance-agent non-transitory computer-readable storage medium $112_Y$, comprise a second group of program instructions GPI02 for causing the one or more processors $240_Y$ of the network node $110_Y$ to collect information about files stored in the network node $110_Y$. The second group of program instructions GPI02 can be the same as the first group of program instructions GPI01. In some embodiments, either one or both of the groups of program instructions GPI01 or GPI02 can cause the respective processors 240 to collect information about files stored in one or more nodes that are neighboring networked nodes and not only about files stored in the respective network node itself. For example, with reference to FIG. 2, the program instructions stored at network node $110_{12}$ can cause the obtaining of information about files stored at network node $110_{12}$ and also about files stored at either or both of neighboring network nodes $110_1$ and $110_{16}$.

Figure 4C:
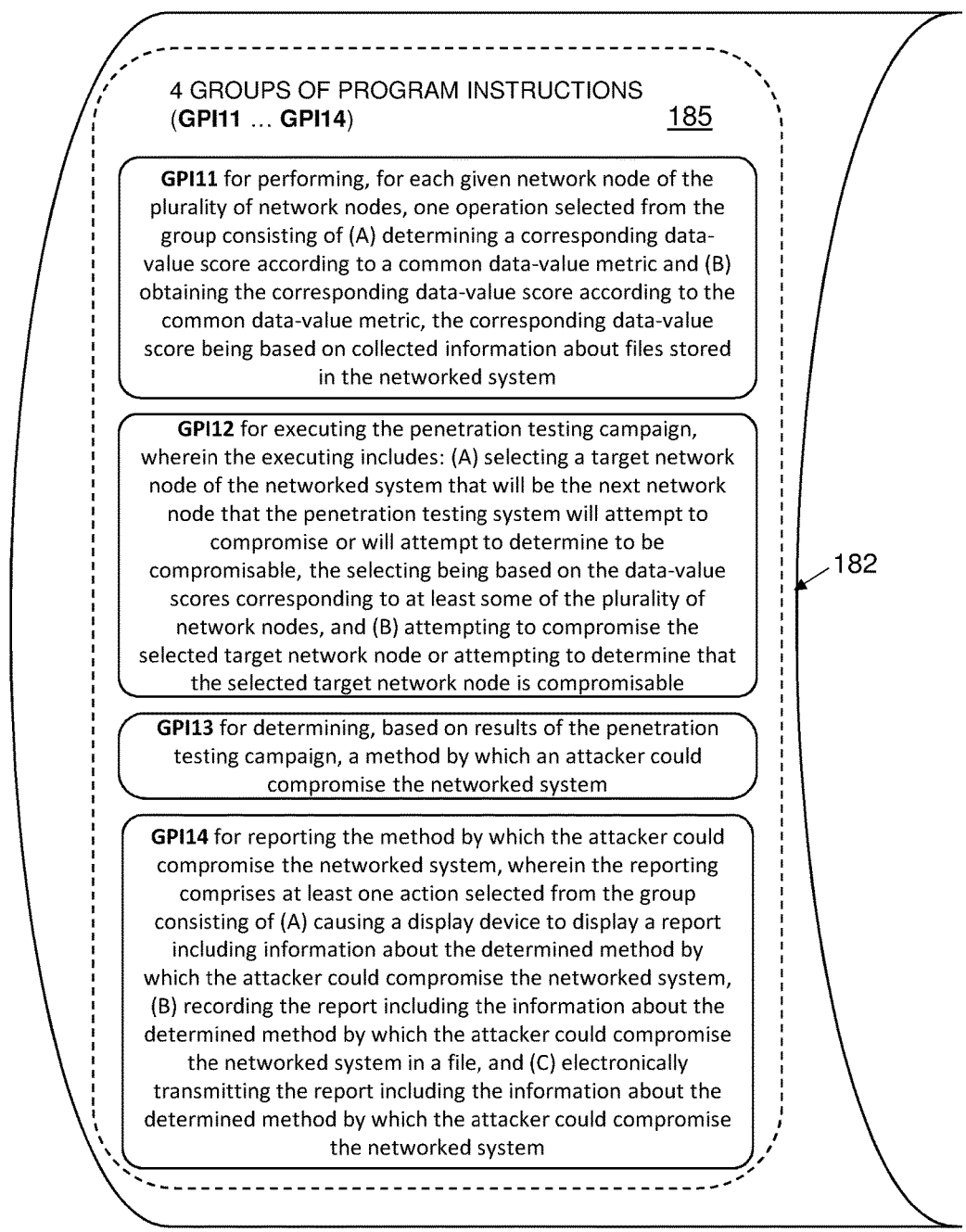
FIG. 4C shows a block diagram of a non-transitory computer-readable storage medium installed at the remote computing device of FIG. 3, comprising groups of program instructions, according to embodiments of the present invention.

3. A penetration-testing non-transitory computer-readable storage medium 182 for storage of instructions 185 of the penetration testing software module (PTSM) 260 for execution by one or more processors 250 of the remote computing device 254. A penetration testing software module 260 is installed in the remote computing device 254. The storage medium 182 is also shown for convenience as being part of the remote computing device 254 but it can be anywhere as long as the one or more processors 250 can access and execute the instructions 185 stored therein. The PTSM 260 can be stored, at least in part, in storage medium 182. As illustrated in the block diagram of FIG. 4C, the program instructions 185 comprise 4 groups of program instructions GPI11 ... GPI14 for execution by the one or more processors 250 of the remote computing device 254:

Program instructions GPI11 for performing, for each given network node 110 of the plurality of network nodes 110, one operation selected from the group consisting of (A) determining a corresponding data-value score according to a common data-value metric and (B) obtaining the corresponding data-value score according to the common data-value metric, the corresponding data-value score being based on collected information about files stored in the networked system $200_1$.

Program instructions GPI12 for executing the penetration testing campaign, wherein the executing includes: (A) selecting a target network node of the networked system $200_1$ that will be the next network node that the penetration testing system will attempt to compromise or will attempt to determine to be compromisable, the selecting being based on the data-value scores corresponding to at least some of the plurality of network nodes 110, and (B) attempting to compromise the selected target network node or attempting to determine that the selected target network node is compromisable.

Program instructions GPI13 for determining, based on results of the penetration testing campaign, a method by which an attacker could compromise the networked system.

Program instructions GPI14 for reporting the method, determined by the execution of program instructions GPI13, by which the attacker could compromise the networked system $200_1$, wherein the reporting comprises at least one action selected from the group consisting of (A) causing a display device to display a report including information about the determined method by which the attacker could compromise the networked system $200_1$, (B) recording the report including the information about the determined method by which the attacker could compromise the networked system $200_1$ in a file, and (C) electronically transmitting the report including the information about the determined method by which the attacker could compromise the networked system $200_1$.

Figure 5:
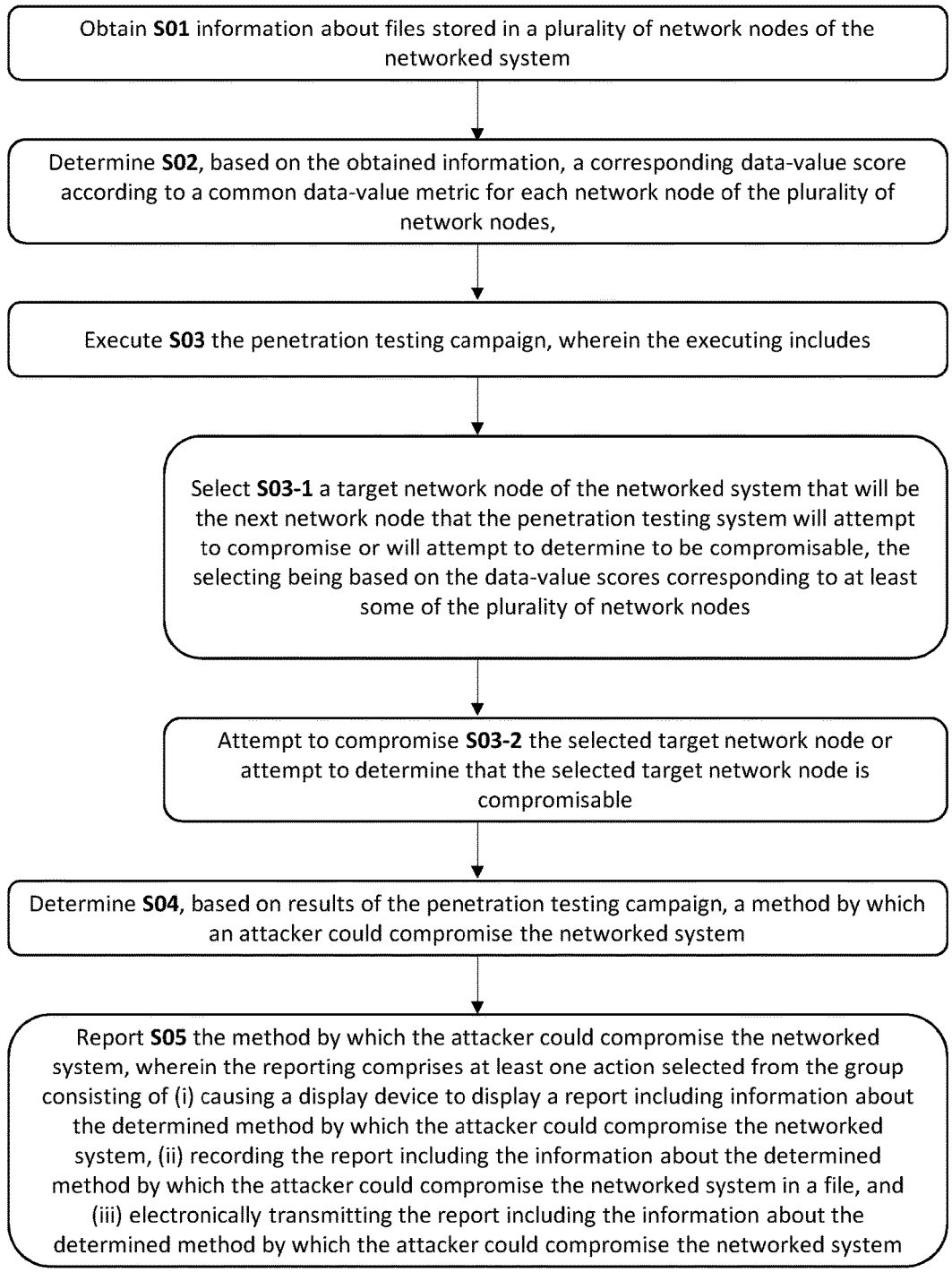
FIG. 5 shows a flowchart of a method of carrying out a penetration testing campaign of a networked system by a penetration testing system, using a lateral movement strategy based at least in part on information about files stored in network nodes of the networked system, according to embodiments of the present invention.

Referring now to FIG. 5, a method is disclosed for carrying out a penetration testing campaign of a networked system 200 (for example, networked system $200_1$ of FIG. 2) by a penetration testing system 100 that uses a lateral movement strategy based at least in part on information about files stored in network nodes 110 of the networked system 200. A non-limiting example of a penetration testing system suitable for carrying out the method is one that comprises (A) a penetration testing software module (PTSM) 260 installed on a remote computing device 254 and (B) a reconnaissance agent software module (RASM) 120 installed on at least a first network node $110_X$ and a second network node $110_Y$ of the networked system. As illustrated by the flow chart in FIG. 5, the method comprises:

Step S01 Obtaining information about files stored in a plurality of network nodes 110 of the networked system 200. Obtaining the information can include, for example, obtaining number (count) of files, the sizes of files, the filetypes of files, the folder/directory location of files, the ages of files, and the names of files. The information can include attributes of files, for example whether files are binary, executable, read-only and/or password-protected. In some embodiments, the information obtained in Step S01 can include some or all of the parameters for every single file stored at a given network node $110_X$. For example, the information can include a table listing the size, filetype, location, age (date created and/or modified) and name for each individual file. In some embodiments, the information obtained in Step S01 can include aggregated, summarized and/or filtered data. For example, the information can include the total size of all files residing in a network node, without including sizes of specific files. In some embodiments, the information obtained in Step S01 can include some information about the files stored at a given network node $110_X$ but not all information. In some embodiments, the information can either include or exclude information about files with given filetypes and/or locations. In an example, the information can include data for only selected filetypes and/or file locations. In another example, the information can include data for only selected file names (e.g. only files whose names start with the prefix "budget"). In preferred embodiments, Step S01 is carried out for a given network node $110_X$ of the networked system $200_1$ by a reconnaissance agent software module 120 installed at the given network node $110_X$. A reconnaissance agent software module 120 installed in a given network node can obtain information about files residing at the given network node itself, at one or more neighboring network nodes, or both.

Step S02 Determining, based on the obtained information, a corresponding data-value score for each network node of the plurality of network nodes, according to a common data-value metric. The common data-value metric is one that can be calculated based on the information about files obtained in Step S01. In some embodiments, determining the corresponding data-value score includes performing one or more calculations from file data parameters such as, for example, file counts and file sizes. The calculations can include arithmetic and other mathematical operations, and/or application of weighting factors to some data elements and not to others. In some embodiments, the information is obtained/retrieved by the PTSM 260 in Step S01 in a format that requires no further calculations. For example, the data-value metric can comprise a simple metric such the number of data files—e.g., Excel files—on the given network node. In such case, the PTSM may obtain the number of Excel files in a given node and the score for the given node is set to be that number. In other examples, determining the data-value score can include combining and/or cross-referencing different file parameters obtained as part of the information obtained in Step S01. A penetration testing system's criteria for selecting or prioritizing nodes to be tested based on the files that can be exported from any given node, can encompass any kinds of filetypes, any sizes of files, any storage locations of files, etc., in any combination. In an example, the data-value metric can equal the sum of the respective counts of Word files and Excel files in corresponding given folders on the node. In another example, the information relied upon when calculating the data-value score can include the file sizes, in kilobytes, megabytes or gigabytes, of every Excel file in the 'my documents' folder of the respective network node, but limited only to files modified or created in the previous two years and having one or more pre-selected words in their names. In yet another example an attacker may be assumed to be interested in compromising nodes 110 that contain engineering drawing filetypes or project plan filetypes, and therefore files with file extensions typical of popular engineering software packages may be given higher importance by the data-value metric. In a further example, the names of files obtained in Step S01 can be used to give greater weight in a data-value score to files having names containing potentially valuable keywords, such as 'strategic', 'financial' or 'marketing plan'. In other examples, a data-value score can depend on file attributes, for example whether a file is read-only or not, a binary file or not, an executable file or not, password-protected or not, or whether a file is larger than a given size. It will be obvious to the skilled artisan that these examples barely scratch the surface of the vast numbers of combinations and calculations based on file parameters that can be used to set up a data-value metric or calculate a data-value score, and any such combinations and calculations are within the scope of the present invention.

Step S03 Executing the penetration testing campaign. Executing the penetration testing campaign includes two sub-steps:

Sub-step S03-1 selecting a target network node of the networked system that will be the next network node that the penetration testing system will attempt to compromise or will attempt to determine to be compromisable, the selecting being based on the data-value scores corresponding to at least some of the plurality of network nodes. The lateral movement strategy according to which the target network node is selected uses the results of the determining of data-value scores in Step S02. The determining of the data-value scores corresponding to the plurality of network nodes (Step S02) can be done prior to or during the executing of the penetration testing campaign.

Sub-step S03-2 attempting to compromise the selected target network node or attempting to determine that the selected target network node is compromisable.

Step S04 Determining, based on results of the penetration testing campaign, a method by which an attacker could compromise the networked system.

Step S05 Reporting the results of Step S04, i.e., reporting the method by which the attacker could compromise the networked system. The reporting comprises at least one action selected from the group consisting of (i) causing a display device to display a report including information about the determined method by which the attacker could compromise the networked system, (ii) recording the report including the information about the determined method by which the attacker could compromise the networked system in a file, and (iii) electronically transmitting the report including the information about the determined method by which the attacker could compromise the networked system.

Similarly to its use in selecting network nodes for targeting during a penetration testing campaign, the data-value metric may be used for prioritizing remediation recommendations. For example, the logic may be that the nodes recommended to be protected with the highest priority will be the nodes having the highest data-value scores (among those nodes which were determined to have a vulnerability that needs fixing).

Here too, the logic may depend on other factors in addition to its dependency on the data-value scores of the nodes. For example, the candidate vulnerable nodes may be sorted according to their data-value scores, and in case of a tie, considerations of costs of exploitation, costs of remediation or probability of success will decide.

Everything stated above regarding the use of a data-value metric for taking decisions about lateral movements during a campaign, is also applicable to the use of a data-value metric for taking decisions about remediation recommendations following a campaign. Specifically, all embodiments of the data-value metric applicable to lateral movement are also applicable to remediation recommendations.

Figure 6:
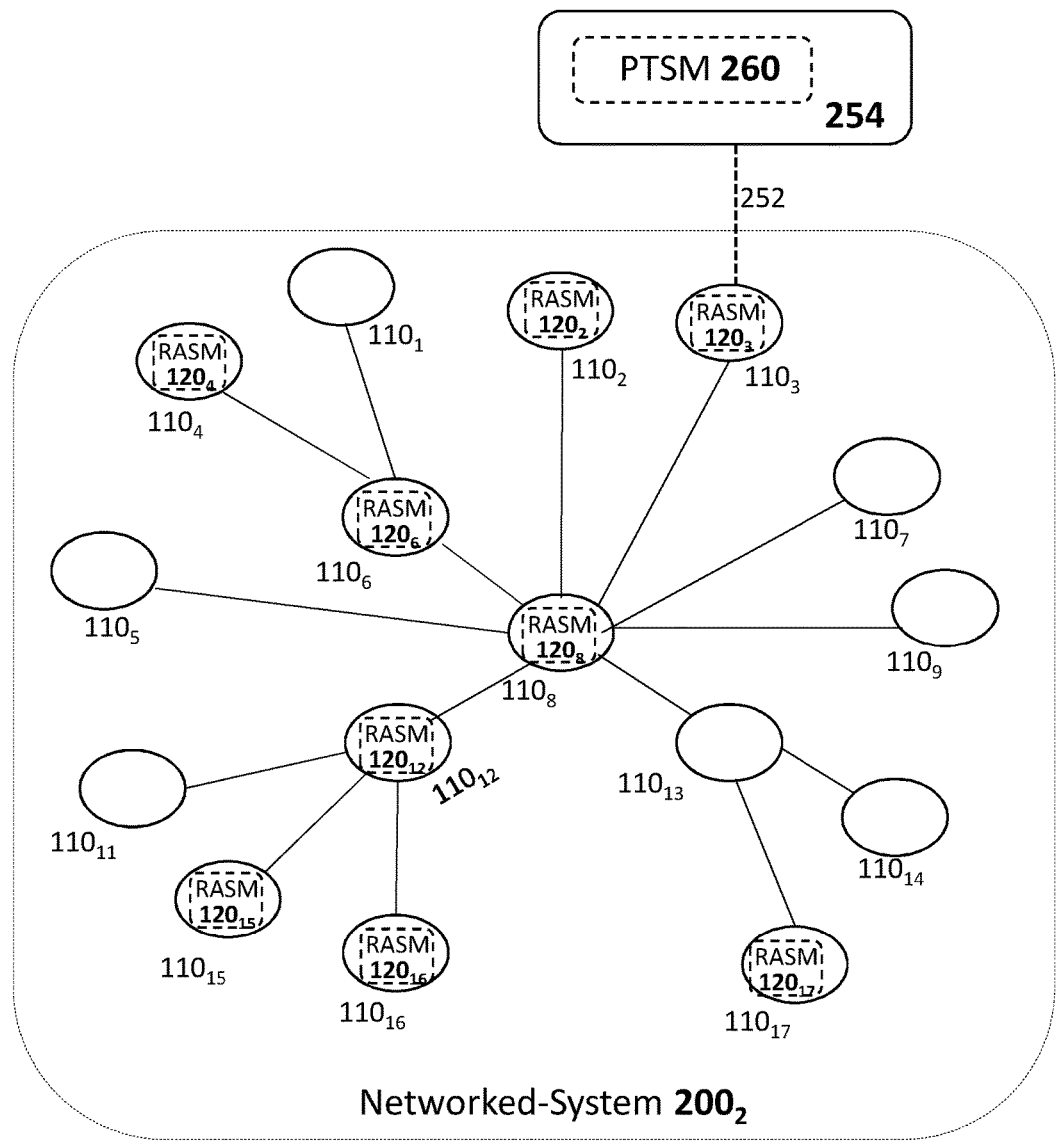
FIG. 6 shows a schematic illustration of a networked system that may be tested according to embodiments of the present invention, the networked system comprising multiple network nodes, some of which have a reconnaissance agent software module installed therein, and a remote computing device having a penetration testing software module installed therein and in connection with the networked system.

Referring now to FIG. 6, an example of a penetration testing system is illustrated schematically in accordance with embodiments of the invention. The penetration testing system comprises a penetration testing software module (PTSM) 260 installed on a computing device 254—in this example remote from the networked system—and a reconnaissance agent software module (RASM) 120 installed on at least some of a plurality of network nodes 110 of a networked system 2002. The illustrated structure of the networked system 2002 is the same as the illustrated structure of networked system $200_1$ in FIG. 2.

Figure 7:
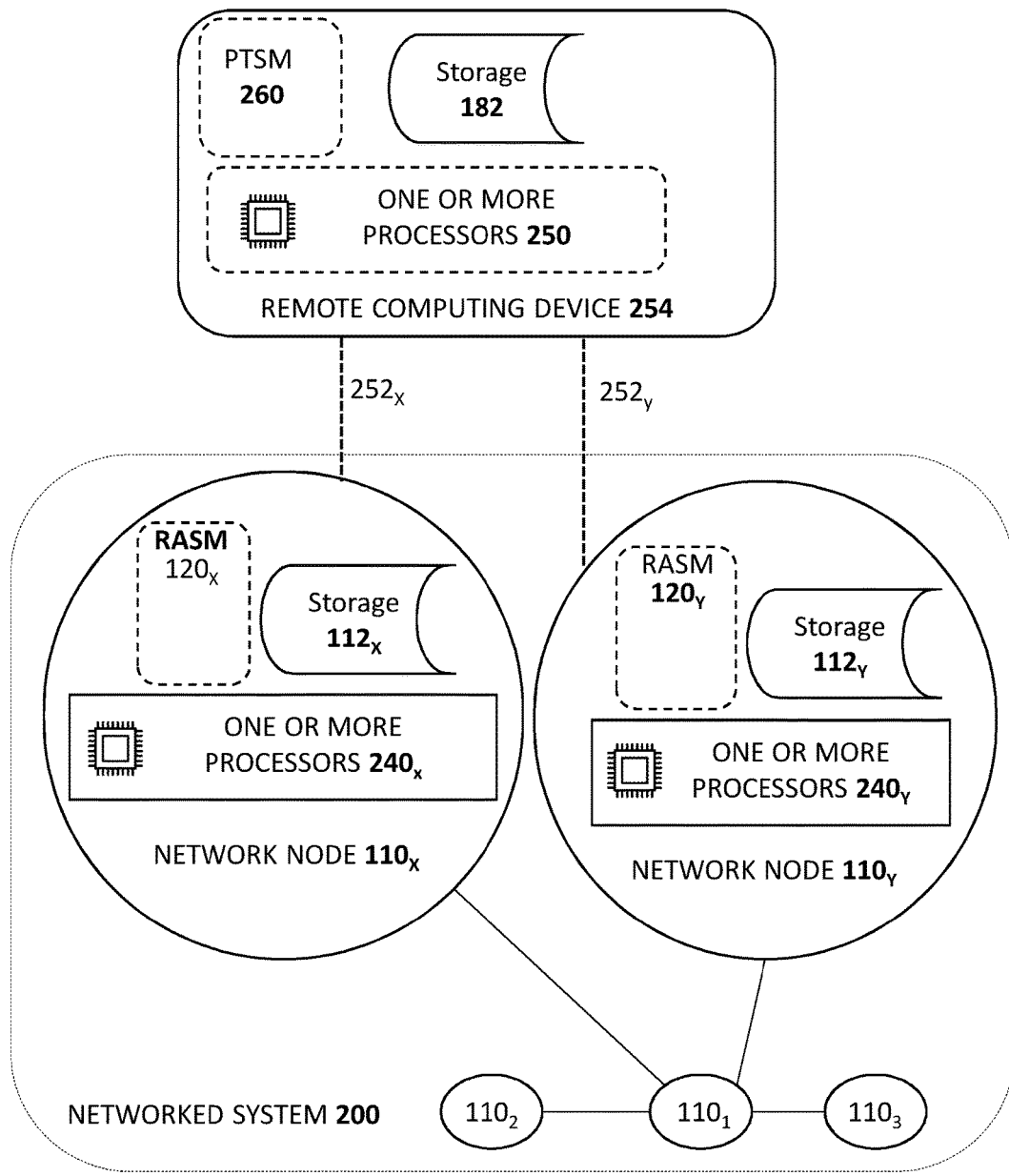
FIG. 7 shows a block diagram of a networked system having first and second network nodes each of which has a reconnaissance agent software module installed therein, and a remote computing device having a penetration testing software module installed therein and in connection with the networked system, according to embodiments of the present invention.

Networked system 2002 of FIG. 7 includes a plurality of network nodes 110. Five nodes 110 ($110_1$, $110_2$, $110_3$, $110_X$ and $110_Y$) are shown, but the networked system 2002 can include any number of nodes. The nodes 110 may be connected by a single network, but in some embodiments at least some of the nodes and respective connections can form sub-networks, so that the networked system 2002 is composed of multiple sub-networks that are in communication with each other. For example, nodes $110_2$ and $110_1$ may be a separate sub-network, with $110_1$ being a gateway or a router. Reconnaissance agent software modules $120_X$, $120_Y$ are installed in first and second network nodes $110_X$, $110_Y$.

As disclosed earlier, the RASM 120 can be installed in any or all of the network nodes 110. The RASMs 120, or at least some program instructions thereof, can be stored in respective storage media 112 of corresponding network nodes 110.

Figure 8A:
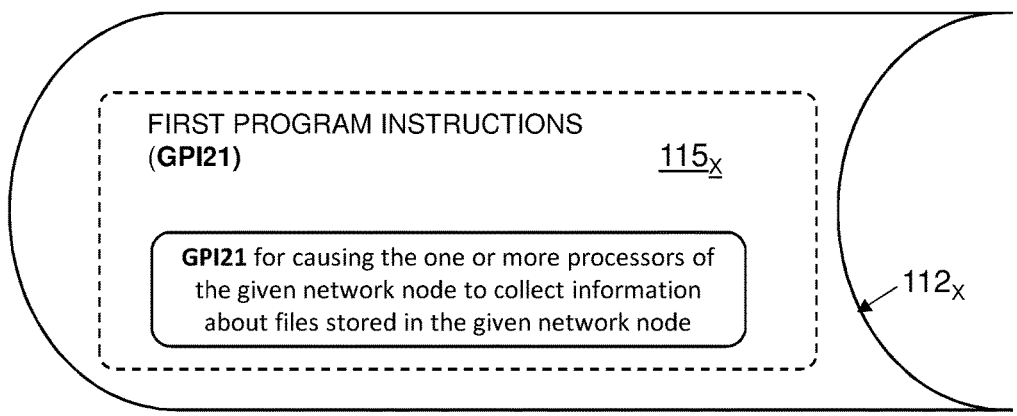
FIGS. 8A and 8B are, respectively, block diagrams of first and second non-transitory computer-readable storage media installed at the first and second network nodes of FIG. 7, comprising respective program instructions, according to embodiments of the present invention.

Components of a penetration testing system, along with other hardware and software components related to the execution of a penetration testing campaign by a penetration testing system, are illustrated in FIG. 7. The penetration testing system itself comprises:

1. A first reconnaissance-agent non-transitory computer-readable storage medium $112_X$ which is associated with a first node $110_X$. This first storage medium $112_X$ is provided for storage of first instructions $115_X$ of the reconnaissance agent software module for execution by one or more processors $240_X$ of the first network node $110_X$, which is in electronic communication with a remote computing device 254 (by communications arrangement $252_X$ which can be an Internet connection or a LAN connection or any other suitable connection, including an indirect connection). A reconnaissance agent software module $120_X$ is installed in the network node $110_X$. The first storage medium $112_X$ is shown for convenience as being part of the network node $110_X$ but it can be anywhere as long as the one or more processors $240_X$ can access and execute the instructions $115_X$ stored therein. As shown in the block diagram of FIG. 8A, the first instructions $115_X$ stored in first reconnaissance-agent non-transitory computer-readable storage medium $112_X$, comprise a first group of program instructions GPI21 for causing the one or more processors $240_X$ of the given network node $110_X$ to collect information about files stored in the network node $110_X$.

Figure 8B:
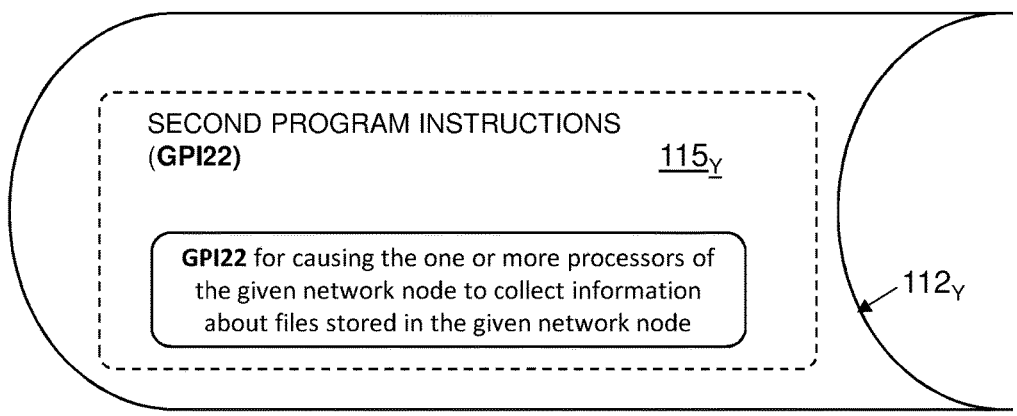

2. A second reconnaissance-agent non-transitory computer-readable storage medium $112_Y$ which is associated with the second node $110_Y$. This second storage medium $112_Y$ is provided for storage of instructions $115_Y$ of the reconnaissance agent software module for execution by one or more processors $240_Y$ of the second network node $110_Y$, which is also in electronic communication with a remote computing device 254 (by communications arrangement $252_Y$ which can be the same as communications arrangement $252_X$ or separate and/or different). A reconnaissance agent software module $120_Y$ is installed in the network node $110_Y$. The second storage medium $112_Y$ is also shown for convenience as being part of the network node $110_Y$ but it can be anywhere as long as the one or more processors $240_Y$ can access and execute the instructions $115_Y$ stored therein. As shown in the block diagram of FIG. 8B, the second instructions $115_Y$ stored in second reconnaissance-agent non-transitory computer-readable storage medium $112_Y$, comprise a second group of program instructions GPI22 for causing the one or more processors $240_Y$ of the given network node $110_Y$ to collect information about files stored in the network node $110_Y$. The second group of program instructions GPI22 can be the same as the first group of program instructions GPI21. In some embodiments, either or both of the groups of program instructions GPI21 or GPI22 can cause the respective processors 240 to collect information about files stored in one or more nodes that are neighboring networked nodes and not only about files stored in the respective network node itself. For example, with reference to FIG. 6, the program instructions stored at network node $110_{12}$ can cause the obtaining of information about files stored at network node $110_{12}$ and also about files stored at either or both of neighboring network nodes $110_{15}$ and $110_{16}$.

Figure 8C:
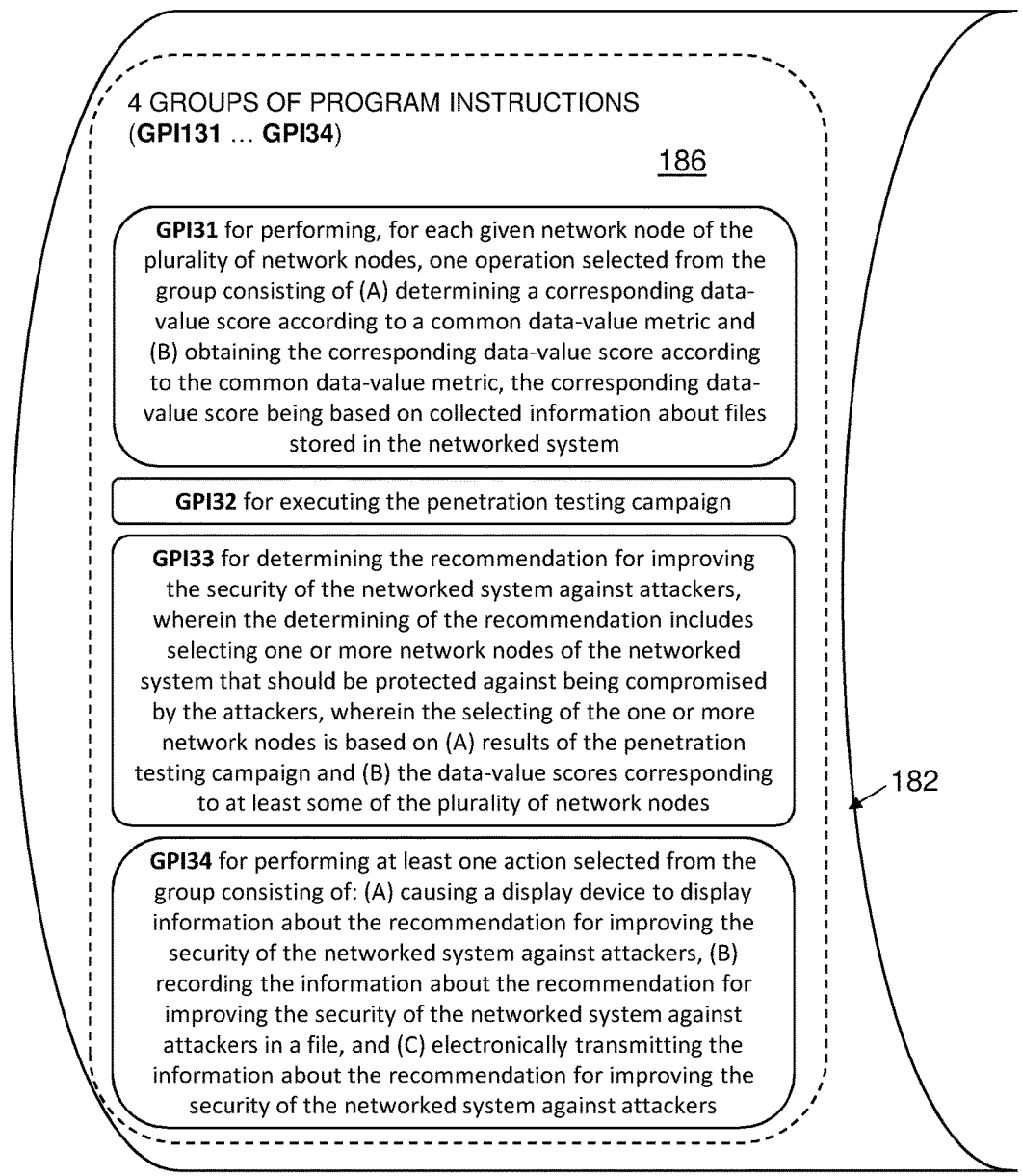
FIG. 8C shows a block diagram of a non-transitory computer-readable storage medium installed at the remote computing device of FIG. 7, comprising groups of program instructions, according to embodiments of the present invention.

3. A penetration-testing non-transitory computer-readable storage medium 182 for storage of instructions 186 of the penetration testing software module (PTSM) 260 for execution by one or more processors 250 of the remote computing device 254. A penetration testing software module 260 is installed in the remote computing device 254. The storage medium 182 is also shown for convenience as being part of the remote computing device 254 but it can be anywhere as long as the one or more processors 250 can access and execute the instructions 186 stored therein. The PTSM 260 can be stored, at least in part, in storage medium 182. As illustrated in the block diagram of FIG. 8C, the program instructions 186 comprise 4 groups of program instructions GPI31 . . . GPI34 for execution by the one or more processors 250 of the remote computing device 254:

Program instructions GPI31 for performing, for each given network node 110 of the plurality of network nodes 110, one operation selected from the group consisting of (A) determining a corresponding data-value score according to a common data-value metric and (B) obtaining the corresponding data-value score according to the common data-value metric, the corresponding data-value score being based on collected information about files stored in the networked system 2002.

Program instructions GPI32 for executing the penetration testing campaign.

Program instructions GPI33 for determining the recommendation for improving the security of the networked system 200 against attackers, wherein the determining of the recommendation includes selecting one or more network nodes 110 of the networked system 200 that should be protected against being compromised by the attackers, wherein the selecting of the one or more network nodes 110 is based on (A) results of the penetration testing campaign and (B) the data-value scores corresponding to at least some of the plurality of network nodes 110.

Program instructions GPI34 for performing at least one action selected from the group consisting of: (A) causing a display device to display information about the recommendation for improving the security of the networked system 2002 against attackers, (B) recording the information about the recommendation for improving the security of the networked system 2002 against attackers in a file, and (C) electronically transmitting the information about the recommendation for improving the security of the networked system 2002 against attackers.

Figure 9:
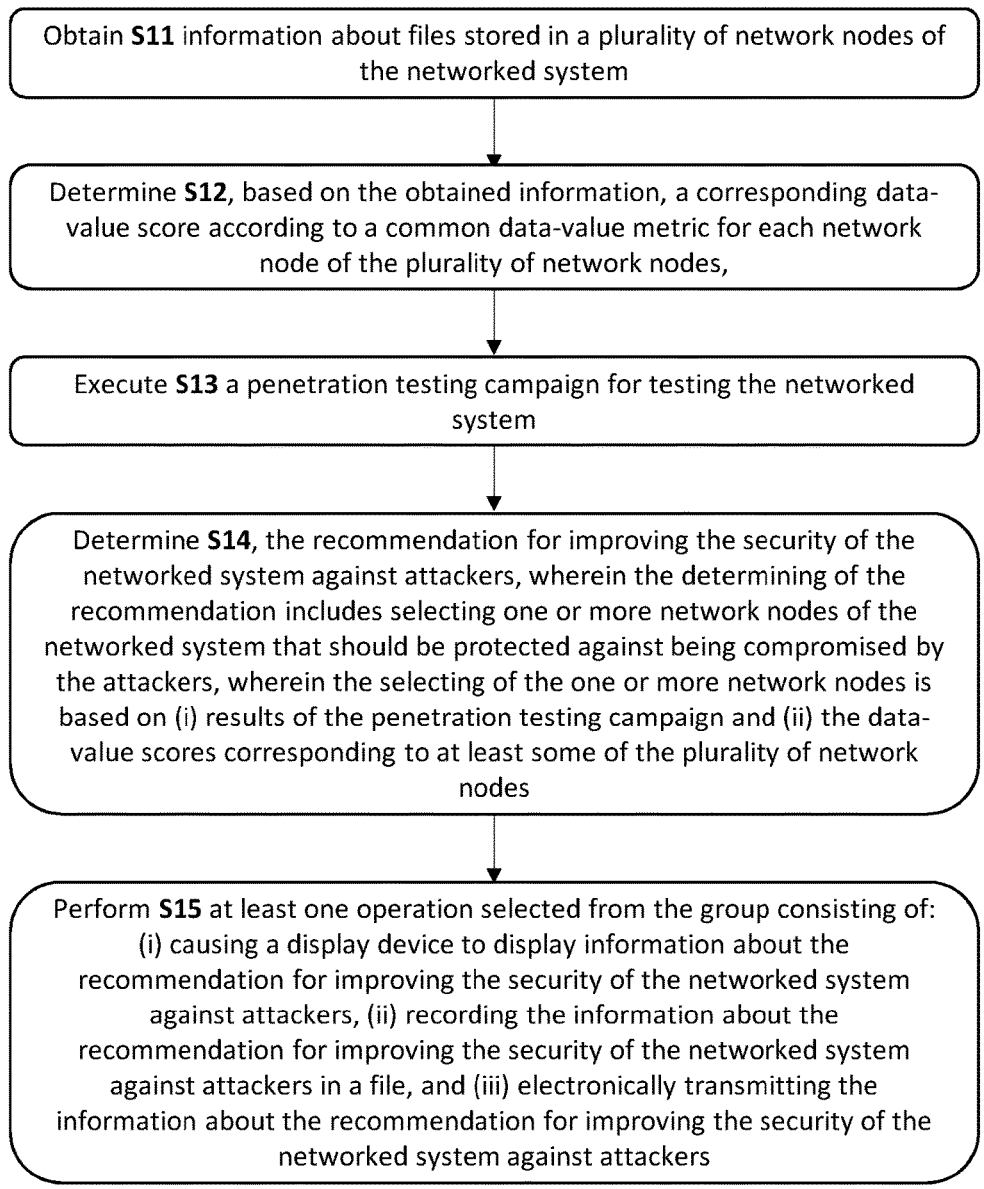
FIG. 9 shows a flowchart of a method for delivering, by a penetration testing system, a recommendation for improving the security of a networked system against attackers, according to embodiments of the present invention.

Referring now to FIG. 9, a method is disclosed for delivering, by a penetration testing system, a recommendation for improving the security of a networked system 200 against attackers. A non-limiting example of a penetration testing system suitable for carrying out the method is one that comprises (A) a penetration testing software module (PTSM) 260 installed on a remote computing device 254 and (B) a reconnaissance agent software module (RASM) 120 installed on at least a first network node $110_X$ and a second network node $110_Y$ of the networked system. As illustrated by the flow chart in FIG. 9, the method comprises:

Step S11 Obtaining information about files stored in a plurality of network nodes 110 of the networked system 200. The earlier discussion with respect to Step S01, concerning obtaining information about files, is also applicable here to Step S11. Obtaining the information can include, for example, obtaining number (count) of files, the sizes of files, the filetypes of files, the folder/directory location of files, the ages of files, and the names of files. The information can include attributes of files, for example whether files are binary, read-only, executable and/or password-protected. In some embodiments, the information obtained in Step S11 can include raw file data and in some embodiments can include aggregated, summarized and/or filtered data. For example, the information can include the total size of all files residing in a network node, without including sizes of specific files. In some embodiments, the information obtained in Step S11 can include some information about the files stored at a given network node $110_X$ but not all information. In some embodiments, the information can either include or exclude information about files with given filetypes and/or locations. In an example, the information can include data for only selected filetypes and/or file locations. In another example, the information can include data for only selected file names (e.g. only files whose names start with the prefix "budget"). In preferred embodiments, Step S11 is carried out for a given network node $110_X$ of the networked system 2002 by a reconnaissance agent software module 120 installed at the given network node $110_X$. A reconnaissance agent software module 120 installed in a given network node can obtain information about files residing at the given network node itself, at one or more neighboring network nodes, or both.

Step S12 Determining, based on the obtained information, a corresponding data-value score for each network node of the plurality of network nodes, according to a common data-value metric. The earlier discussion with respect to Step S02, concerning the data-value metric, is also applicable here to Step S12. The common data-value metric is one that can be calculated based on the information about files obtained in Step S11. Similar to the determining of Step S02, determining the corresponding data-value score in Step S12 includes performing one or more calculations from file data parameters such as, for example, file counts and file sizes, include arithmetic and other mathematical operations, and/or application of weighting factors to some data elements and not to others. In some embodiments, the information is obtained/retrieved by the PTSM 260 in Step S11 in a format that requires no further calculations. In some examples, determining the data-value score can include combining and/or cross-referencing different file parameters obtained as part of the information obtained in Step S11. In an example, the data-value metric can equal the sum of the respective counts or the respective file sizes of Word files and Excel files in respective given folders on the node, because nodes with more files of those two types may be seen as being more important to protect against attackers. In another example it may be more desirable to improve the security of nodes having engineering drawing filetypes or project plan filetypes, and therefore files with file extensions typical of popular engineering software packages may be given higher importance by the data-value metric. In a further example, the names of files obtained in Step S11 can be used to give greater weight in a data-value score to files having names containing potentially valuable keywords. In other examples, a data-value score can depend on file attributes, for example whether a file is read-only or not, a binary file or not, an executable file or not, password-protected or not, or whether a file is larger than a given size. Any combinations and/or calculations of file data parameters can be used to set up a data-value metric or calculate a data-value score, and any such combinations and calculations are within the scope of the present invention.

Step S13 Executing the penetration testing campaign. In this step a penetration testing campaign is executed, to determine methods in which a networked system 200 can be compromised. The determining of the data-value scores corresponding to the plurality of network nodes (i.e., of Step S12) can be done prior to, during, or subsequent to the executing of the penetration testing campaign Step S14 Determining the recommendation for improving the security of the networked system against attackers, wherein the determining of the recommendation includes selecting one or more network nodes of the networked system that should be protected against being compromised by the attackers, wherein the selecting of the one or more network nodes is based on (i) results of the penetration testing campaign and (ii) the data-value scores corresponding to at least some of the plurality of network nodes.

Step S15 Performing at least one operation selected from the group consisting of: (i) causing a display device to display information about the recommendation (determined in Step S14) for improving the security of the networked system against attackers, (ii) recording the information about the recommendation for improving the security of the networked system against attackers in a file, and (iii) electronically transmitting the information about the recommendation for improving the security of the networked system against attackers.

Figure 10B:
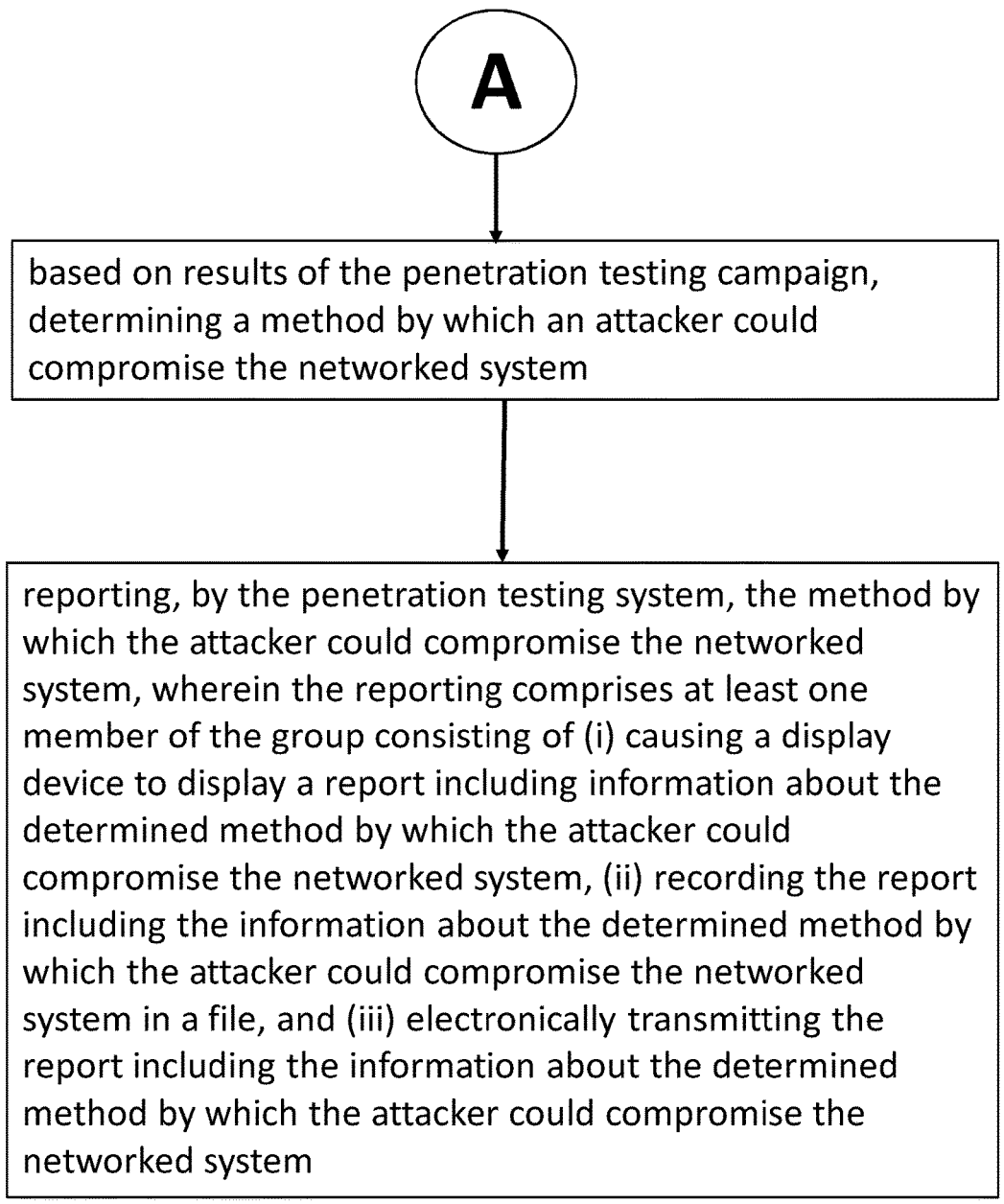

FIGS. 10A and 10B illustrate steps of a method that is most useful for carrying out a penetration testing campaign of a networked system by a penetration testing system, the method comprising:
 a. for each network node in a group of multiple network nodes of the networked system, determining a corresponding data-value score according to a common data-value metric;
 b. initiating execution of the penetration testing campaign;
 c. during the execution of the penetration testing campaign:
  i. selecting a target network node of the networked system that will be the next network node that the penetration testing system will attempt to compromise or will attempt to determine to be compromisable, the selecting being based on the data-value scores corresponding to at least some of the multiple network nodes;
  ii. attempting to compromise the selected target network node or attempting to determine that the target network node is compromisable;
 d. based on results of the penetration testing campaign, determining a method by which an attacker could compromise the networked system;
 e. reporting, by the penetration testing system, the method by which the attacker could compromise the networked system, wherein the reporting comprises at least one member of the group consisting of (i) causing a display device to display a report including information about the determined method by which the attacker could compromise the networked system, (ii) recording the report including the information about the determined method by which the attacker could compromise the networked system in a file, and (iii) electronically transmitting the report including the information about the determined method by which the attacker could compromise the networked system.

FIGS. 11A and 11B illustrates steps of a method that is most useful for providing, by a penetration testing system, a recommendation for improving the security of a networked system against attackers, the method comprising:
 a. for each network node in a group of multiple network nodes of the networked system, determining a corresponding data-value score according to a common data-value metric;
 b. executing a penetration testing campaign by the penetration testing system, the penetration testing campaign for testing the networked system;
 c. based on results of the penetration testing campaign, determining the recommendation for improving the security of the networked system against attackers, the determining including selecting one or more network nodes of the networked system that should be protected against being compromised by the attackers, wherein the selecting of the one or more network nodes is based on the data-value scores corresponding to at least some of the multiple network nodes;
 d. providing the recommendation for improving the security of the networked system, the providing of the recommendation for improving the security comprising at least one operation selected from the group consisting of: (i) causing a display device to display information about the recommendation for improving the security, (ii) recording the information about the recommendation for improving the security in a file, and (iii) electronically transmitting the information about the recommendation for improving the security.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

Definitions

This disclosure should be interpreted according to the definitions below.

In case of a contradiction between the definitions in this Definitions section and other sections of this disclosure, this section should prevail.

In case of a contradiction between the definitions in this section and a definition or a description in any other document, including in another document incorporated in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.
2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.

3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.

5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.

6. "network node of a networked system" or "node of a networked system"—Any computing device or peripheral device that belongs to the networked system.

7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation". Note that just assuming that a vulnerability will succeed in compromising a given network node or a given networked system under current conditions without executing either active validation or passive validation, is not considered as validating the vulnerability.

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system.

If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign" or just "campaign"—A specific run of a specific test of a specific networked system by the penetration testing system.

An execution of a campaign must end by one of the following: (i) determining by the penetration testing system that the goal of the attacker was reached by the campaign, (ii) determining by the penetration testing system that the goal of the attacker cannot be reached by the campaign, (iii) if the campaign is assigned a time limit, exceeding the time limit by the campaign, and (iv) manually terminating the campaign by a user of the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.

A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

22. "pre-defined scenario", "pre-defined test scenario", "scenario template" or "template scenario"—A scenario that exists in storage accessible to a penetration testing system before the time a campaign is started, and can be selected by a user of the penetration testing system for defining a campaign of penetration testing. A pre-defined scenario may be created and provided by the provider of the penetration testing system and may be part of a library of multiple pre-defined scenarios. Alternatively, a pre-defined scenario may be created by the user of the penetration testing system using a scenario editor provided by the provider of the penetration testing system.

A penetration testing system may require that a campaign of penetration testing that is based on a pre-defined scenario must have all its values of information items taken from the pre-defined scenario, with no exceptions. Alternatively, a penetration testing system may allow a user to select a pre-defined scenario and then override and change one or more values of information items of a campaign that is based on the pre-defined scenario.

23. "attacker" or "threat actor"—An entity, whether a single person, a group of persons or an organization, that might conduct an attack against a networked system by penetrating it for uncovering its security vulnerabilities and/or for compromising it.

24. "a type of an attacker"—A classification of the attacker that indicates its main incentive in conducting attacks of networked systems. Typical values for a type of an attacker are state-sponsored, opportunistic cyber criminal, organized cyber criminal and insider.

An attacker can have only a single type.

25. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.

An attacker can have one or multiple capabilities.

26. "a goal of an attacker"—What the attacker of a campaign is trying to achieve when attacking a targeted networked system. In other words, what is the criterion according to which the attacker will judge whether the attack was a success or a failure and/or to what extent was it a success or a failure. Selecting a type of an attacker may cause a default selection of a goal for that attacker, but the user may have an option to override the default selection. An attacker can have one or multiple goals.

27. "a lateral movement strategy of an attacker"—A decision logic applied by the attacker of a campaign for selecting the next network node to try to compromise. During a penetration testing campaign, the attacker is assumed to make progress by an iterative process in which in each iteration he selects the next node to attack, based on the group of network nodes he already controls (i.e. that are already compromised). If the attack on the selected node is successful, that node is added to the group of nodes that are already compromised, and another iteration starts. If the attempt to compromise the selected node fails, another node is selected, either according to some other rule or randomly.

It should be noted that all types of penetration testing systems, whether using simulated penetration testing, actual attack penetration testing or some other form of penetration testing, must use a lateral movement strategy. In the case of a penetration testing system that actually attacks the tested networked system, the lateral movement strategy selects the path of attack actually taken through the networked system. In the case of a penetration testing system that simulates or evaluates the results of attacking the tested networked system, the lateral movement strategy selects the path of attack taken in the simulation or the evaluation through the networked system. Therefore in the above explanation, the term "attack" should be understood to mean "actual attack or simulated attack", the term "already controls" should be understood to mean "already controls or already determined to be able to control", the term "already compromised" should be understood to mean "already compromised or already determined to be compromisable", etc.

A simple example of a lateral movement strategy is a "depth first" strategy. In such strategy, the next network node to try to compromise is (i) either an immediate neighbor of or reachable from the last network node that was compromised, and (ii) is not yet compromised (provided such neighbor node exists).

Another simple example is a "breadth search" strategy. In such strategy, the next network node to try to compromise is a network node whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one.

An example of a more advanced lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource and picking the first node on this path to be the next node to try to compromise. Note that if the shortest path has a length of one (which happens when the specific node is an immediate neighbor of an already compromised node), then the next node to try to compromise is the specific node containing the desired resource.

Another example of a lateral movement strategy is a strategy that gives priority to network nodes satisfying a specific condition, for example nodes that are known to have a specific weakness, such as running the Windows XP operating system. In such case the next node to try to compromise is a node that satisfies the condition and is also either an immediate neighbor of or reachable from an already compromised node (if such node exists).

Typically, an attacker uses a single lateral movement strategy during an attack.

28. "network nodes A and B are immediate neighbors of each other"—Network nodes A and B have a direct communication link between them that does not pass through any other network node.

29. "network node A can communicate with network node B" or "network node B is reachable from network node A"—Network node A can send information (e.g. commands and/or data) to network node B. The sent information may be passed directly between the two network nodes without passing through any other network node, or it may be passed through one or more other nodes. The communication channel between the two network nodes may be a two-way communication channel, with which each of the two network nodes can send information to the other one. Alternatively, the communication channel may be a one-way communication channel, enabling network node A to send information to network node B, but not the other way around.

30. "penetration testing by simulation" or "simulated penetration testing"—Penetration testing in which the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

31. "penetration testing by actual attack" or "actual attack penetration testing" or "penetration testing by actual exploit" or "actual exploit penetration testing"—Penetration testing in which the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

32. "penetration testing by reconnaissance agents" or "reconnaissance agent penetration testing"—Penetration testing in which the functionality of the reconnaissance function is at least partially implemented by a reconnaissance agent software module installed and executed in each one of multiple network nodes of the tested networked system.

33. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

34. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

35. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system. The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

36. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

37. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

38. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

39. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

40. "resource of a network node"—A file in the network node, a folder in the network node, credentials of a user residing in the network node (the credentials not necessarily applying to the network node containing the credentials), a peripheral device of the network node or a communication device accessible to the network node.

41. "resource of a networked system"—A file in a network node of the networked system, a folder in a network node of the networked system, credentials of a user of the networked system, a peripheral device of a network node of the networked system, a peripheral device directly attached to a network of the networked system, or a communication device accessible by a network node of the networked system.

42. "access rights" (of a user in a network node)—Rights of the user to perform operations on resources of the network node. For example, a right to execute a given file or a given class of files, a right to read from a given file or from a given folder, a right to create a new file in a given folder, a right to change a given file, a right to print on a given printer, or a right to send out data through a given communication device.

43. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

44. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

45. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

46. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

47. "session-hijacking attack"—a cyber-attack where a valid communication session between two network nodes in a networked system is used by an attacker to gain unauthorized access to information or services in the networked computer system.

48. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

49. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

50. "administrator of a network node"—Any person that is authorized, among other things, to define or change at least one rule controlling at least one of an access right, a permission, a priority and a configuration in the network node.

51. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

52. "remote computing device" or "penetration testing remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.

53. "explicitly selecting"—Directly and clearly selecting, by a human user, of one option out of multiple options available to the human user, leaving no room for doubt and not relying on making deductions by a computing device.

Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

54. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

55. "executable file"—A computer file that contains instructions that may be executed by a computer. An executable file may be a binary file (e.g. when containing machine code) or a text file (e.g. when containing interpreted scripting code).

56. "text file"—A computer file that includes mostly text. A text file may include some non-textual content. For example, Microsoft Word files may include some non-textual control characters or metadata but are still considered text files.

57. "binary file"—Any computer file that is not a text file. A binary file may include some textual content. For example, executable files containing machine code may include textual strings that are part of the executable code but are still considered binary files.

58. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

59. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse). An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

60. "setting a campaign to be based on a pre-defined scenario"—Selecting the values of the information items of the campaign at least partially according to the corresponding values of the information items of the pre-defined scenario. The setting includes assigning to every information item of the campaign the value of the corresponding information item of the pre-defined scenario. Optionally, after the assigning, the setting may further include manually overriding and changing one or more of the assigned values of the information items of the campaign.

61. "random selection"—A selection that depends on a random or pseudo-random factor. Different possible outcomes in a random selection do not necessarily have the same probabilities of being selected.

62. "attacker step"—One or more actions performed by an attacker of a networked system in order to achieve a certain result. An attacker step may be included in an actual or potential attempt of an attacker to compromise a networked system that includes one or more attacker steps. Performing a given attacker step may be conditioned on certain achievements being already achieved by the attacker prior to carrying out the given attacker step.

An example of an attacker step that consists of a single action is the recovering of a password enabling access to a given network node from a known hash code (e.g. using a pre-compiled dictionary of hash codes and their corresponding passwords, when the algorithm of hashing is known). In this example, the attacker step is conditioned on a prior achievement by the attacker of finding out the hash code. An example of an attacker step that consists of multiple actions is the recovering of a password enabling access to a given network node based on an ability to remotely execute arbitrary code in the given network node (e.g. remotely executing in the given network node code that obtains a hash code of a password enabling access to the given network node, and then recovering the corresponding password from its hash code as in the previous example). In this example, the attacker step is conditioned on a prior achievement by the attacker of obtaining an ability to remotely execute arbitrary code in the given network node.

As can be seen from the above examples, the breaking out of a potential attack plan into attacker steps is somewhat arbitrary. The second example above including a single attacker step consisting of two actions could have been defined to include two separate attacker steps, each including a single action—the first attacker step consisting of remotely executing in the given network node code that obtains the hash code, and the second attacker step consisting of recovering the password from its hash code.

63. "remediation action" or just "remediation"—An action that improves the security of a networked system by making one or more attacker steps practically unavailable, more expensive, more difficult, less efficient and/or less useful for attackers of the networked system.

An example of a remediation action that makes only a single attacker step practically unavailable to attackers is the installing of a defensive measure applicable only to a single network node (e.g. installing in a single network node a software utility that locally requires fingerprints identification on top of requiring a password in order to allow access).

An example of a remediation action that makes multiple attacker steps practically unavailable to attackers is the replacing of a common algorithm or a common method used in multiple network nodes of the networked system by an improved algorithm or method (e.g. the global replacing of a simple password hash code calculation algorithm by an improved password hash code algorithm that uses salt in its calculation). In such case, each given network node benefiting from the improved algorithm corresponds to a different attacker step targeting the given network node.

A remediation action that makes the one or more attacker steps practically unavailable does not necessarily make the one or more attacker steps completely unavailable to the attackers. If an action makes the one or more attacker steps too costly for the attackers to use (i.e. makes the cost of exploitation of the one or more attacker steps so high that there is very low probability that the attackers would use them), then the action is considered to make the one or more attacker steps practically unavailable to the attackers and therefore is a remediation action. An example of a remediation action that does not make the one or more attacker steps practically unavailable to the attackers is an action of replacing an encryption algorithm using a short key with a similar encryption algorithm using a longer key. This may result in the deciphering of the encrypted data by an attacker taking a much longer time than before. This in turn makes the one or more attacker steps less efficient to use, and therefore such action is considered to be a remediation action.

64. "sub-goal" or "achievement"—A result or ability obtained by an attacker by successfully performing an attacker step against a networked system, where the attacker was not in possession of the result or ability before performing the attacker step.

For example, obtaining a password enabling access to a given network node of the networked system is a possible sub-goal. It may be obtained by an attacker by carrying out the attacker step "recovering of a password to the given network node from a known password hash code".

A special case of a sub-goal is a dummy sub-goal representing a state in which an attacker has no possession of any result or ability which is not available to all. A dummy sub-goal is assumed to be achievable by any attacker even before carrying out any attacker step. In some cases, a sub-goal may be automatically obtained by an attacker following the obtaining of another sub-goal, without having to perform any additional attacker step. For example, the sub-goal "compromise either node X or node Y" is automatically obtained once the sub-goal "compromise node X" was obtained, without having to perform any additional attacker step. In such case it can be assumed that the sub-goal is obtained by a dummy attacker step that does nothing.

65. "blocking an attacker step", "blocking a vulnerability"—Making the attacker step or the exploitation of the vulnerability (as the case may be) practically unavailable, more expensive, more difficult, less efficient and/or less useful to attackers. The blocking of the attacker step or the exploitation of the vulnerability is done by implementing a remediation action.

66. "cost of exploitation of an attacker step", "cost of exploitation of a vulnerability"—A measure of how difficult or expensive it is for an attacker to use the attacker step or to exploit the vulnerability (as the case may be). For example, an attacker step using the attacking method known as "ARP Spoofing" is costlier for the attacker than an attacker step using a method of attack taken from a publicly available exploit kit.

The cost of exploitation may be represented by a numeric score within a given range, typically (but not necessarily) with a higher score indicating a costlier attacker step. For example, the given range may be [0 . . . 10], with the cost of exploitation using ARP Spoofing being 7, and the cost of exploitation using a method taken from a publicly available exploit kit being 2. Alternatively, a lower score may represent a costlier attacker step.

67. "cost of remediation of an attacker step", "cost of remediation of a vulnerability"—A measure of how difficult or expensive it is for the organization owning the networked system to which the attacker step or the exploitation of the vulnerability is applied to block the attacker step or the exploitation of the vulnerability (as the case may be). For example, an attacker step that can be blocked by simply installing a security patch for a software application (e.g. Microsoft Word) is much less costly to block than an attacker step that requires buying and installing a new router in order to split an existing sub-network into two different sub-networks. The cost of remediation may be represented by a numeric score within a given range, typically (but not necessarily) with a higher score representing a costlier attacker step. For example, the given range may be [0 . . . 10], with the cost of a remediation action requiring only installing a patch being 1, and the cost of a remediation action requiring a new router being 8. Alternatively, a lower score may represent a costlier attacker step.

68. "probability of success of an attacker step", "probability of success of a vulnerability"—A measure of how probable is it that execution of the attacker step or an attempt to exploit the vulnerability (as the case may be) by the attacker will succeed in achieving the sub-goal that the attacker step is intended to achieve or will succeed in compromising the networked system, taking into account currently available knowledge regarding the state of the attacked networked system. For example, an attacker step that is based on exploiting a known Windows 7 vulnerability may have high probability of success when applied to a network node having the original version of the OS installed, while having a low probability of success when applied to a network node in which a certain security patch had also been installed.

Typically, probabilities of success are expressed in percentages in the range of 0% to 100%. Alternatively, the probabilities of success may be represented by numeric values in the range of zero to one, where zero corresponds to 0% and one corresponds to 100%. However, any other numerical scale may be used for representing probabilities of success, provided that the scale is a monotonically increasing or monotonically decreasing function of how probable is it that the attacker step will succeed in achieving its sub-goal.

69. "a data-value metric"—A function that calculates a data-value score for a given network node, based on the data files residing in the given network node and/or on the data files residing in one or more other network nodes that are reachable from the given network node. The data-value score of a network node is a measure of the value gained by an attacker when obtaining access to the data stored in the files becoming accessible to the attacker when compromising the network node, and/or the value lost by the owner of the networked system when losing or exposing the data stored in the files becoming accessible to the attacker when compromising the network node. Typically, the data-value score of a network node is a measure of the quantity, importance and/or confidentiality of the data stored in the files becoming accessible to the attacker when compromising the network node.

Some data-value metrics generate numerical scores, while other data-value metrics generate non-numerical scores (e.g. using designations such as "A", "B" and "C" for representing categories of "high value", "medium value" and "low value"). For some numerical data-value metrics, the higher the numerical value of the data-value score of a network node, the more valuable is the data stored in the files becoming accessible to the attacker when compromising the network node. For other numerical data-value metrics, the lower the numerical value of the data-value score of a network node, the more valuable is the data stored in the files becoming accessible to the attacker when compromising the network node.

The term "highest data-value score" (in a group of data-value scores) refers to the data-value score corresponding to the network node which, when compromised by an attacker, results in the attacker getting access to files having the highest value, regardless if the numerical value of that score is the highest or the lowest. As stated above, a data-value score calculated for a given network node may depend on files residing in one or more other network nodes, provided that those one or more other network nodes are reachable from the given network node. This is useful when compromising the given network node opens the way for the attacker to compromise the one or more other network nodes. For example, the given network node for which the data-value score is calculated may be the only gateway into a sub-network including nodes containing highly valuable data. The gateway node itself may contain no important files, but it is desirable to have the data-value metric assign the gateway node a high data-value score because of the high value of the data in the sub-network.

The calculation of a data-value score may take into account the number of files and/or the size of files residing in a network node. Additionally, the calculation may take into account the location of files within the network node—ignoring files residing in certain folders, giving higher weight to files residing in certain folders, etc. Additionally, the calculation may take into account the types of files residing in a network node—ignoring files of certain types, giving higher weight to files of certain types, etc. Other factors may also be taken into account—for example giving higher weight to files that are write protected.

The calculation may depend on any combination of the above factors. For example, a data-value score of a given network node may include summing (i) the number of files in the C: drive of the given network node, (ii) the total size of files in the My Documents folder of the given network node, (iii) five times the total size of Excel files (having an "xls" or "xlsx" extension) in the My Documents folder of the given network node, and (iv) three times the total size of files in another network node which is accessible only through the given network node.

70. "a Boolean condition"—A statement that can have a value of either true or false. If the statement is true, we say that the Boolean condition is satisfied. If the statement is false, we say that the Boolean condition is not satisfied.

71. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

72. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

73. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

74. "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat". Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat".

Note that in "one of dogs and cats", "dogs" and "cats" are not categories but specific groups (i.e. specific items). Therefore, "one of dogs and cats" is equivalent to "only dogs or only cats, but not both dogs and cats" Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C, but not a combination of two or three members of the group consisting of: one of A, one of B and one of C", and "at least one of A, B and C" is equivalent to "only at least one of A or only at least one of B or only at least one of C, or any combination of two or three members of the group consisting of: one of A, one of B and one of C".

If the list following the "one of" or the "at least one of" contains more than three members, then the previous definitions are again applicable, with the appropriate modifications that extrapolate the above logic.

Note that "one or more of" is equivalent to "at least one of", and the two terms are synonyms.

The invention claimed is:

1. A method of carrying out a penetration testing campaign of a networked system by a penetration testing system, using a lateral movement strategy based at least in part on information about files stored in network nodes of the networked system, the method comprising:
    a. obtaining information about files stored in a plurality of network nodes of the networked system;
    b. based on the obtained information, determining, for each network node of the plurality of network nodes, a corresponding data-value score according to a common data-value metric;
    c. executing the penetration testing campaign, wherein the executing includes:
        i. selecting a target network node of the networked system that will be a next network node that the penetration testing system will attempt to compromise or will attempt to determine to be compromisable, the selecting being based on the data-value scores corresponding to at least some of the plurality of network nodes, and
        ii. attempting to compromise the selected target network node or attempting to determine that the selected target network node is compromisable;
    d. based on results of the penetration testing campaign, determining a method by which an attacker could compromise the networked system; and
    e. reporting the method by which the attacker could compromise the networked system, wherein the reporting comprises at least one action selected from the group consisting of (i) causing a display device to display a report including information about the determined method by which the attacker could compromise the networked system, (ii) recording the report including the information about the determined method by which the attacker could compromise the networked system in a file, and (iii) electronically transmitting the report including the information about the determined method by which the attacker could compromise the networked system.

2. The method of carrying out a penetration testing campaign of claim 1, wherein the data-value score corresponding to a given network node is based on the total size of all files residing in the given network node.

3. The method of carrying out a penetration testing campaign of claim 1, wherein the data-value score corresponding to a given network node is based on the total size of all files residing in one or more given folders in the given network node.

4. The method of carrying out a penetration testing campaign of claim 1, wherein the data-value score corresponding to a given network node is based on the total size of all files of one or more given types residing in the given network node.

5. The method of carrying out a penetration testing campaign of claim 1, wherein the data-value score corresponding to a given network node is based on the number of all files residing in the given network node.

6. The method of carrying out a penetration testing campaign of claim 1, wherein the data-value score corresponding to a given network node is based on the number of all files residing in one or more given folders in the given network node.

7. The method of carrying out a penetration testing campaign of claim 1, wherein the data-value score corresponding to a given network node is based on the number of all files of one or more given types residing in the given network node.

8. The method of carrying out a penetration testing campaign of claim 1, wherein the data-value score corresponding to a given network node is based on one or more numbers selected from the group consisting of:
  a. total size of all files residing in the given network node,
  b. total size of all files residing in one or more given folders in the given network node,
  c. total size of all files of one or more given types residing in the given network node,
  d. total size of all files of one or more given types residing in one or more given folders in the given network node,
  e. number of all files residing in the given network node,
  f. number of all files residing in one or more given folders in the given network node,
  g. number of all files of one or more given types residing in the given network node,
  h. number of all files of one or more given types residing in one or more given folders in the given network node.

9. The method of carrying out a penetration testing campaign of claim 1, wherein the data-value score corresponding to a given network node is based on a size of at least one file residing in a second network node that is reachable from the given network node.

10. The method of carrying out a penetration testing campaign of claim 1, wherein the data-value score corresponding to a given network node is based on a number selected from the group consisting of (i) number of files residing in a second network node, (ii) number of files residing in one or more given folders in the second network node, (iii) number of files residing in the second network node and are of one or more given types, and (iv) number of files residing in the one or more given folders in the second network node and are of the one or more given types, the second network node being reachable from the given network node.

11. A penetration testing system for carrying out a penetration testing campaign of a networked system by using a lateral movement strategy based at least in part on information about files stored in network nodes of the networked system, the networked system comprising a plurality of network nodes interconnected by one or more networks, each network node of the plurality of network nodes including one or more processors, the penetration testing system comprising:
  a. a first non-transitory computer-readable storage medium having stored therein first program instructions, wherein execution of the first program instructions by the one or more processors of a given network node of the plurality of network nodes causes the one or more processors of the given network node to collect information about files stored in the given network node:
  b. a computing device comprising one or more processors, the computing device in networked communication with multiple network nodes of the networked system; and
  c. a second non-transitory computer-readable storage medium having stored therein second program instructions, wherein execution of the second program instructions by the one or more processors of the computing device causes the one or more processors of the computing device to carry out the following steps:
    i. for each given network node of the plurality of network nodes, performing one operation selected from the group consisting of (A) determining a corresponding data-value score according to a common data-value metric and (B) obtaining the corresponding data-value score according to the common data-value metric, the corresponding data-value score being based on collected information about files stored in the networked system;
    ii. executing the penetration testing campaign, wherein the executing includes:
      A. selecting a target network node of the networked system that will be next network node that the penetration testing system will attempt to compromise or will attempt to determine to be compromisable, the selecting being based on the data-value scores corresponding to at least some of the plurality of network nodes, and
      B. attempting to compromise the selected target network node or attempting to determine that the selected target network node is compromisable;
    iii. based on results of the penetration testing campaign, determining a method by which an attacker could compromise the networked system; and
    iv. reporting the method by which the attacker could compromise the networked system, wherein the reporting comprises at least one action selected from the group consisting of (A) causing a display device to display a report including information about the determined method by which the attacker could compromise the networked system, (B) recording the report including the information about the determined method by which the attacker could compromise the networked system in a file, and (C) electronically transmitting the report including the information about the determined method by which the attacker could compromise the networked system.

12. A method for delivering, by a penetration testing system, a recommendation for improving the security of a networked system against attackers, the method comprising:
  a. obtaining information about files stored in a plurality of network nodes of the networked system;
  b. based on the obtained information, determining, for each network node of the plurality of network nodes, a corresponding data-value score according to a common data-value metric;
  c. executing a penetration testing campaign for testing the networked system;
  d. determining the recommendation for improving the security of the networked system against attackers, wherein the determining of the recommendation includes selecting one or more network nodes of the networked system that should be protected against being compromised by the attackers, wherein the selecting of the one or more network nodes is based on (i) results of the penetration testing campaign and (ii) the data-value scores corresponding to at least some of the plurality of network nodes;
  e. performing at least one operation selected from the group consisting of: (i) causing a display device to display information about the recommendation for improving the security of the networked system against attackers, (ii) recording the information about the recommendation for improving the security of the networked system against attackers in a file, and (iii) electronically transmitting the information about the recommendation for improving the security of the networked system against attackers,
  wherein the data-value score corresponding to a given network node is based on one or more numbers selected from the group consisting of:
    A. total size of all files residing in the given network node;

B. total size of all files residing in one or more given folders in the given network node;
C. total size of all files of one or more given types residing in the given network node;
D. total size of all files of one or more given types residing in one or more given folders in the given network node:
E. number of all files residing in the given network node;
F. number of all files residing in one or more given folders in the given network node;
G. number of all files of one or more given types residing in the given network node; and
H. number of all files of one or more given types residing in one or more given folders in the given network node.

13. The method of claim 12, wherein the data-value score corresponding to the given network node is based on the total size of all files residing in the given network node.

14. The method of claim 12, wherein the data-value score corresponding to the given network node is based on the total size of all files residing in one or more given folders in the given network node.

15. The method of claim 12, wherein the data-value score corresponding to the given network node is based on the total size of all files of one or more given types residing in the given network node.

16. The method of claim 12, wherein the data-value score corresponding to the given network node is based on the number of all files residing in the given network node.

17. The method of claim 12, wherein the data-value score corresponding to the given network node is based on the number of all files residing in one or more given folders in the given network node.

18. The method of claim 12, wherein the data-value score corresponding to the given network node is based on the number of all files of one or more given types residing in the given network node.

19. The method of claim 12, wherein the data-value score corresponding to the given network node is based on a size of at least one file residing in a second network node that is reachable from the given network node.

20. A method for delivering, by a penetration testing system, a recommendation for improving the security of a networked system against attackers, the method comprising:
   a. obtaining information about files stored in a plurality of network nodes of the networked system;
   b. based on the obtained information, determining, for each network node of the plurality of network nodes, a corresponding data-value score according to a common data-value metric;
   c. executing a penetration testing campaign for testing the networked system;
   d. determining the recommendation for improving the security of the networked system against attackers, wherein the determining of the recommendation includes selecting one or more network nodes of the networked system that should be protected against being compromised by the attackers, wherein the selecting of the one or more network nodes is based on (i) results of the penetration testing campaign and (ii) the data-value scores corresponding to at least some of the plurality of network nodes; and
   e. performing at least one operation selected from the group consisting of: (i) causing a display device to display information about the recommendation for improving the security of the networked system against attackers, (ii) recording the information about the recommendation for improving the security of the networked system against attackers in a file, and (iii) electronically transmitting the information about the recommendation for improving the security of the networked system against attackers, wherein the data-value score corresponding to a given network node is based on a number selected from the group consisting of (i) number of files residing in a second network node, (ii) number of files residing in one or more given folders in the second network node, (iii) number of files residing in the second network node and are of one or more given types, and (iv) number of files residing in the one or more given folders in the second network node that are of the one or more given types, the second network node being reachable from the given network node.

21. A penetration testing system configured to carry out a penetration testing campaign for testing a networked system and to deliver a recommendation for improving the security of the networked system against attackers based at least in part on information about files stored in network nodes of the networked system, the networked system comprising a plurality of network nodes interconnected by one or more networks, each network node of the plurality of network nodes including one or more processors, the penetration testing system comprising:
   a. a first non-transitory computer-readable storage medium having stored therein first program instructions, wherein execution of the first program instructions by the one or more processors of a given network node of the plurality of network nodes causes the one or more processors of the given network node to collect information about files stored in the given network node;
   b. a computing device comprising one or more processors, the computing device in networked communication with multiple network nodes of the networked system; and
   c. a second non-transitory computer-readable storage medium having stored therein second program instructions, wherein execution of the second program instructions by the one or more processors of the computing device causes the one or more processors of the computing device to carry out the following steps:
      i. for each given network node of the plurality of network nodes, performing one operation selected from the group consisting of (A) determining a corresponding data-value score according to a common data-value metric and (B) obtaining the corresponding data-value score according to the common data-value metric, the corresponding data-value score being based on collected information about files stored in the networked system;
      ii. executing the penetration testing campaign;
      iii. determining the recommendation for improving the security of the networked system against attackers, wherein the determining of the recommendation includes selecting one or more network nodes of the networked system that should be protected against being compromised by the attackers, wherein the selecting of the one or more network nodes is based on (A) results of the penetration testing campaign and (B) the data-value scores corresponding to at least some of the plurality of network nodes; and
      iv. performing at least one action selected from the group consisting of: (A) causing a display device to display information about the recommendation for improving the security of the networked system against attackers, (B) recording the information about the recommendation for improving the security of the networked system against attackers in a file, and (C) electronically transmitting the information about the recommendation for improving the security of the networked system against attackers.

\* \* \* \* \*

UNITED STATES PATENT AND TRADEMARK OFFICE
CERTIFICATE OF CORRECTION

PATENT NO. : 10,469,521 B1
APPLICATION NO. : 16/379820
DATED : November 5, 2019
INVENTOR(S) : Ronen Segal and Menahem Lasser Page 1 of 1

It is certified that error appears in the above-identified patent and that said Letters Patent is hereby corrected as shown below:

In the Claims

Column 50 Line 6, Claim 11:
Delete the phrase "will be next"
And replace with --will be a next--

Column 51 Line 7, Claim 12:
Delete the phrase "network node:"
And replace with --network node;--

Signed and Sealed this
Twenty-fourth Day of December, 2019

Andrei Iancu
*Director of the United States Patent and Trademark Office*